US012675917B2

(12) United States Patent
Kansy et al.

(10) Patent No.: US 12,675,917 B2
(45) Date of Patent: Jul. 7, 2026

(54) IDENTITY-PRESERVING IMAGE GENERATION USING DIFFUSION MODELS

(71) Applicants: DISNEY ENTERPRISES, INC., Burbank, CA (US); ETH Zürich (Eidgenössische Technische Hochschule Zürich), Zürich (CH)

(72) Inventors: Manuel Jakob Kansy, Zurich (CH); Anton Julien Raël, Zurich (CH); Jacek Krzysztof Naruniec, Windlach (CH); Christopher Richard Schroers, Uster (CH); Romann Matthew Weber, Uster (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 339 days.

(21) Appl. No.: 18/320,857

(22) Filed: May 19, 2023

(65) Prior Publication Data

US 2023/0377214 A1 Nov. 23, 2023

Related U.S. Application Data

(60) Provisional application No. 63/343,928, filed on May 19, 2022.

(51) Int. Cl.
G06T 11/00 (2026.01)
G06T 5/70 (2024.01)
(Continued)

(52) U.S. Cl.
CPC .............. G06T 11/00 (2013.01); G06T 5/70 (2024.01); G06V 10/82 (2022.01); G06V 40/171 (2022.01);
(Continued)

(58) Field of Classification Search
CPC . G06T 11/00; G06T 5/70; G06T 2207/20081; G06T 2207/30201;
(Continued)

(56) References Cited

U.S. PATENT DOCUMENTS

2019/0238568 A1* 8/2019 Goswami .............. G06F 21/566
2020/0097767 A1* 3/2020 Perry ................... G06V 40/172
(Continued)

OTHER PUBLICATIONS

Bussi et al., "Accurate Sampling Using Langevin Dynamics", Physical Review E, vol. 75, DOI: 10.1103/PhysRevE.75.056707, May 25, 2007, pp. 056707-1-056707-7.
(Continued)

*Primary Examiner* — Michelle Chin
(74) *Attorney, Agent, or Firm* — Squire Patton Boggs LLP; Sarah Mirza

(57) ABSTRACT

One embodiment of the present invention sets forth a technique for performing identity-preserving image generation. The technique includes converting an identity image depicting a facial identity into an identity embedding. The technique further includes generating a combined embedding based on the identity embedding and a diffusion iteration identifier. The technique further includes converting, using a neural network and based on the combined embedding, a first input image that includes first noise into a first predicted image depicting one or more facial features that include one or more first facial identity features, wherein the one or more first facial identity features correspond to one or more respective second facial identity features of the identity image and are based at least on the identity embedding.

18 Claims, 8 Drawing Sheets

(51) Int. Cl.
    *G06V 10/82*          (2022.01)
    *G06V 40/16*          (2022.01)
(52) U.S. Cl.
    CPC .............. *G06T 2207/20081* (2013.01); *G06T 2207/30201* (2013.01); *G06T 2210/32* (2013.01); *G06V 2201/10* (2022.01)
(58) Field of Classification Search
    CPC .. G06T 2210/32; G06V 40/171; G06V 10/82; G06V 2201/10
    See application file for complete search history.

(56)               References Cited

U.S. PATENT DOCUMENTS

| | | | |
|---|---|---|---|
| 2022/0012511 A1* | 1/2022 | Rowe | G06V 10/82 |
| 2023/0067841 A1* | 3/2023 | Saharia | G06N 3/047 |
| 2023/0222628 A1* | 7/2023 | Zhao | G06V 40/168 |
| | | | 382/156 |

OTHER PUBLICATIONS

Chen et al., "SimSwap: An Efficient Framework for High Fidelity Face Swapping", Deep Learning for Multimedia, In Proceedings of the 28th ACM International Conference on Multimedia, https://doi.org/10.1145/3394171.3413630, Oct. 12-16, 2020, pp. 2003-2011.

Choi et al., "StarGAN v2: Diverse Image Synthesis for Multiple Domains", arXiv:1912.01865, Apr. 26, 2020, 14 pages.

Cole et al., "Synthesizing Normalized Faces from Facial Identity Features", arXiv:1701.04851, Oct. 17, 2017, 14 pages.

Creswell et al., "Inverting the Generator of a Generative Adversarial Network", IEEE Transactions on Neural Networks and Learning Systems, DOI 10.1109/TNNLS.2018.2875194, 2018, pp. 1-8.

Deng et al., "RetinaFace: Single-shot Multi-level Face Localisation in the Wild", IEEE/CVF Conference on Computer Vision and Pattern Recognition, DOI 10.1109/CVPR42600.2020.00525, 2020, pp. 5202-5211.

Deng et al., "ArcFace: Additive Angular Margin Loss for Deep Face Recognition", IEEE/CVF Conference on Computer Vision and Pattern Recognition, DOI 10.1109/CVPR.2019.00482, 2019, pp. 4685-4694.

Dhariwal et al., "Diffusion Models Beat GANs on Image Synthesis", arXiv:2105.05233, Jun. 1, 2021, pp. 1-44.

Duong et al., "Vec2Face: Unveil Human Faces from their Blackbox Features in Face Recognition", arXiv:2003.06958, Mar. 16, 2020, 10 pages.

Efron, Bradley, "Tweedie's Formula and Selection Bias", Journal of the American Statistical Association, DOI: 10.1198/jasa.2011.tm11181, vol. 106, No. 496, Dec. 2011, pp. 1602-1614.

Goodfellow et al., "Explaining and Harnessing Adversarial Examples", arXiv:1412.6572, Dec. 20, 2014, pp. 1-10.

Goswami et al., "Unravelling Robustness of Deep Learning based Face Recognition Against Adversarial Attacks", Association for the Advancement of Artificial Intelligence, arXiv:1803.00401, Feb. 22, 2018, 8 pages.

Guo et al., "Towards Fast, Accurate and Stable 3D Dense Face Alignment", arXiv:2009.09960, Sep. 21, 2020, pp. 1-21.

He et al., "Deep Residual Learning for Image Recognition", In Proceedings of the IEEE Conference on Computer Vision and Pattern Recognition, 2016, pp. 770-778.

Heusel et al., "GANs Trained by a Two Time-Scale Update Rule Converge to a Nash Equilibrium", arXiv:1706.08500, Jun. 26, 2017, pp. 1-61.

Ho et al., "Denoising Diffusion Probabilistic Models", 34th Conference on Neural Information Processing Systems, arXiv:2006.11239, Dec. 16, 2020, pp. 1-25.

Ho et al., "Classifier-Free Diffusion Guidance", arXiv:2207.12598, Jul. 26, 2022, pp. 1-14.

Huang et al., "Labeled Faces in the Wild: A Database for Studying Face Recognition in Unconstrained Environments", 2008, pp. 1-11.

Karras et al., "Elucidating the Design Space of Diffusion-Based Generative Models", 36th Conference on Neural Information Processing Systems, arXiv:2206.00364, Oct. 11, 2022, pp. 1-47.

Karras et al., "A Style-Based Generator Architecture for Generative Adversarial Networks", arXiv:1812.04948, Mar. 29, 2019, pp. 1-12.

Kim et al., "Smooth-Swap: A Simple Enhancement for Face-Swapping with Smoothness", arXiv:2112.05907, May 5, 2022, pp. 1-16.

Kim et al., "Noise2Score: Tweedie's Approach to Self-Supervised Image Denoising without Clean Images", 35th Conference on Neural Information Processing Systems, arXiv:2106.07009, Oct. 27, 2021, pp. 1-16.

Kim et al., "AdaFace: Quality Adaptive Margin for Face Recognition", In Proceedings of the IEEE/CVF Conference on Computer Vision and Pattern Recognition, 2022, pp. 1-17.

Kortylewski et al., "Empirically Analyzing the Effect of Dataset Biases on Deep Face Recognition Systems", arXiv:1712.01619, Apr. 19, 2018, pp. 1-11.

Kynkäänniemi et al., "Improved Precision and Recall Metric for Assessing Generative Models", 33rd Conference on Neural Information Processing Systems, arXiv:1904.06991, Oct. 30, 2019, pp. 1-16.

Lee et al., "DRIT++: Diverse Image-to-Image Translation via Disentangled Representations", International Journal of Computer Vision, https://doi.org/10.1007/s11263-019-01284-z, Feb. 3, 2020, 16 pages.

Li et al., "Look Through Masks: Towards Masked Face Recognition with De-Occlusion Distillation", In Proceedings of the 28th ACM International Conference on Multimedia, https://doi.org/10.1145/3394171.3413960, Oct. 12-16, 2020, pp. 3016-3024.

Liu et al., "Learning to Learn across Diverse Data Biases in Deep Face Recognition", 2022, pp. 4072-4082.

Liu et al., "SphereFace: Deep Hypersphere Embedding for Face Recognition", arXiv:1704.08063, Apr. 26, 2017, 9 pages.

Mahendran et al., "Understanding Deep Image Representations by Inverting Them", In Proceedings of the IEEE Conference on Computer Vision and Pattern Recognition, 2015, pp. 5188-5196.

Mignon et al., "Reconstructing Faces from their Signatures using RBF Regression", 2013, pp. 1-12.

Mohanty et al., "From Scores to Face Templates: A Model-Based Approach", IEEE Transactions on Pattern Analysis and Machine Intelligence, DOI 10.1109/TPAMI.2007.1129, vol. 29, No. 12, Dec. 2007, pp. 2065-2078.

Mordvintsev et al., "Inceptionism: Going Deeper into Neural Networks", Jun. 18, 2015, pp. 1-7.

Moschoglou et al., "AgeDB: The First Manually Collected, In-The-Wild Age Database", IEEE Conference on Computer Vision and Pattern Recognition Workshops, DOI 10.1109/CVPRW.2017.250, 2017, pp. 1997-2005.

Nichol et al., "Improved Denoising Diffusion Probabilistic Models", arXiv:2102.09672, Feb. 18, 2021, pp. 1-17.

Nitzan et al., "Face Identity Disentanglement via Latent Space Mapping", ACM Trans. Graph, https://doi.org/10.1145/3414685.3417826, vol. 39, No. 6, Article 225, Dec. 2020, pp. 225:1-225:23.

Parkhi et al., "Deep Face Recognition", Visual Geometry Group, 2015, pp. 1-12.

Qiu et al., "End2End Occluded Face Recognition by Masking Corrupted Features", IEEE Transactions on Pattern Analysis and Machine Intelligence, arXiv:2108.09468, Aug. 21, 2021, pp. 1-14.

Radford et al., "Learning Transferable Visual Models From Natural Language Supervision", arXiv:2103.00020, Feb. 26, 2021, pp. 1-48.

Ramesh et al., "Hierarchical Text-Conditional Image Generation with CLIP Latents", arXiv:2204.06125, Apr. 23, 2022, 27 pages.

Razzhigaev et al., "Black-Box Face Recovery from Identity Features", arXiv:2007.13635, Jul. 30, 2020, pp. 1-14.

Ronneberger et al., "U-Net: Convolutional Networks for Biomedical Image Segmentation", arXiv:1505.04597, May 18, 2015, 8 pages.

Saharia et al., "Photorealistic Text-to-Image Diffusion Models with Deep Language Understanding", arXiv:2205.11487, May 23, 2022, pp. 1-46.

Schroff et al., "FaceNet: A Unified Embedding for Face Recognition and Clustering", arXiv:1503.03832, Jun. 17, 2015, pp. 1-10.

(56) References Cited

OTHER PUBLICATIONS

Sengupta et al., "Frontal to Profile Face Verification in the Wild", 2016, 9 pages.

Simonyan et al., "Deep Inside Convolutional Networks: Visualising Image Classification Models and Saliency Maps", arXiv:1312.6034, Dec. 20, 2013, pp. 1-8.

Singh et al., "On the Robustness of Face Recognition Algorithms Against Attacks and Bias", Association for the Advancement of Artificial Intelligence, arXiv:2002.02942, Feb. 7, 2020, 7 pages.

Song et al., "Score-Based Generative Modeling Through Stochastic Differential Equations", arXiv:2011.13456, Nov. 26, 2020, pp. 1-32.

Sun et al., "Deep Learning Face Representation by Joint Identification-Verification", arXiv:1406.4773, Jun. 18, 2014, pp. 1-9.

Taigman et al., "DeepFace: Closing the Gap to Human-Level Performance in Face Verification", IEEE Conference on Computer Vision and Pattern Recognition, DOI 10.1109/CVPR.2014.220, 2014, pp. 1701-1708.

Terhorst et al., "A Comprehensive Study on Face Recognition Biases Beyond Demographics", Journal of Latex Class Files, arXiv:2103.01592, vol. 14, No. 8, Mar. 2, 2021, pp. 1-14.

Vaswani et al., "Attention Is All You Need", 31st Conference on Neural Information Processing Systems, arXiv:1706.03762, Dec. 6, 2017, pp. 1-15.

Vendrow et al., "Realistic Face Reconstruction from Deep Embeddings", 35th Conference on Neural Information Processing Systems, 2021, pp. 1-6.

Wang et al., "Additive Margin Softmax for Face Verification", arXiv:1801.05599, May 30, 2018, pp. 1-7.

Wang et al., "CosFace: Large Margin Cosine Loss for Deep Face Recognition", Tencent AI Lab, arXiv:1801.09414, Apr. 3, 2018, 11 pages.

Welling et al., "Bayesian Learning via Stochastic Gradient Langevin Dynamics", In Proceedings of the 28th International Conference on Machine Learning, 2011, 8 pages.

Xia et al., "GAN Inversion: A Survey", arXiv:2101.05278, Mar. 22, 2022, pp. 1-17.

Yang et al., "Neural Network Inversion in Adversarial Setting via Background Knowledge Alignment", Session 2B: ML Security, Association for Computing Machinery, https://doi.org/10.1145/3319535.3354261, Nov. 11-15, 2019, pp. 225-240.

Yi et al., "Learning Face Representation from Scratch", arXiv:1411.7923, Nov. 28, 2014, pp. 1-9.

Yosinski et al., "Understanding Neural Networks Through Deep Visualization", 31st International Conference on Machine Learning, arXiv:1506.06579, Jun. 22, 2015, pp. 1-12.

Zhang et al., "Joint Face Detection and Alignment Using Multitask Cascaded Convolutional Networks", IEEE Signal Processing Letters, DOI 10.1109/LSP.2016.2603342, vol. 23, No. 10, Oct. 2016, pp. 1499-1503.

Zhang et al., "The Unreasonable Effectiveness of Deep Features as a Perceptual Metric", arXiv:1801.03924, Apr. 10, 2018, pp. 1-14.

Zhmoginov et al., "Inverting face embeddings with convolutional neural networks", arXiv:1606.04189, Jul. 7, 2016, pp. 1-12.

Cao et al., "VGGFace2: A Dataset for Recognising Faces Across Pose and Age", arXiv:1710.08092, Oct. 23, 2017, 10 pages.

Che et al., "Mode Regularized Generative Adversarial Networks", ICLR, arXiv:1612.02136, Dec. 7, 2016, pp. 1-12.

Cong et al., "Face Dataset Augmentation with Generative Adversarial Network", Journal of Physics: Conference Series, doi:10.1088/1742-6596/2218/1/012035, 2022, pp. 1-7.

Crispell et al., "Dataset Augmentation for Pose and Lighting Invariant Face Recognition", arXiv:1704.04326, Apr. 14, 2017, 9 pages.

Esler, Tim, "Face Recognition Using Pytorch", Facenet Pytorch, Retrieved from https://github.com/timesler/facenet-pytorch, 2017, pp. 1-9.

Goodfellow et al., "Generative Adversarial Nets", arXiv:1406.2661, Jun. 10, 2014, pp. 1-9.

He et al., "Arbitrary Facial Attribute Editing: Only Change What You Want", arXiv:1711.10678, Nov. 29, 2017, pp. 1-9.

Li et al., "Generate Identity-Preserving Faces by Generative Adversarial Networks", arXiv:1706.03227, Jun. 25, 2017, pp. 1-9.

Mai et al., "Face Image Reconstruction from Deep Templates", arXiv:1703.00832, Mar. 2, 2017, pp. 1-14.

Masi et al., "Do We Really Need to Collect Millions of Faces for Effective Face Recognition?", arXiv:1603.07057, Apr. 11, 2016, pp. 1-18.

Serengil et al., "LightFace: A Hybrid Deep Face Recognition Framework", IEEE, 2020, 5 pages.

Shorten et al., "A survey on Image Data Augmentation for Deep Learning", Journal of Big Data, https://doi.org/10.1186/s40537-019-0197-0, vol. 6, 2019, pp. 1-48.

Wang et al., "A Survey on Face Data Augmentation", arXiv:1904.11685, Apr. 26, 2019, 26 pages.

Yang et al., "Image Data Augmentation for Deep Learning: A Survey", arXiv:2204.08610, Apr. 19, 2022, 8 pages.

Zeno et al., "PFA-GAN: Pose Face Augmentation Based on Generative Adversarial Network", Informatica, DOI: https://doi.org/10.15388/21-INFOR443, Jan. 2021, pp. 1-16.

Serengil et al., "HyperExtended LightFace: A Facial Attribute Analysis Framework", 2021 International Conference on Engineering and Emerging Technologies (ICEET). IEEE, https://doi.org/10.1109/ICEET53442.2021.9659697, 4 pages.

* cited by examiner

IDENTITY-PRESERVING IMAGE GENERATION USING DIFFUSION MODELS

CROSS-REFERENCE TO RELATED APPLICATIONS

This application claims priority benefit of the U.S. Provisional Patent Application titled, "TECHNIQUES FOR GENERATING AN IMAGE INCLUDING AN INDIVIDUAL," filed on May 19, 2022, and having Ser. No. 63/343,928. The subject matter of this related application is hereby incorporated herein by reference.

BACKGROUND

Field of the Various Embodiments

Embodiments of the present disclosure relate generally to machine learning and computer vision and, more specifically, to techniques for generating images of individuals.

Description of the Related Art

As used herein, a facial identity of an individual refers to an appearance of a face that is considered distinct from facial appearances of other entities due to differences in personal identity, age, or the like. Two facial identities may be of different individuals or the same individual under different conditions, such as the same individual at different ages.

A face of an individual depicted in an image, such as a digital photograph or a frame of digital video, can be converted to a value referred to as an identity embedding in a latent space. The identity embedding includes a representation of identity features of the individual and can, in practice, also include other features that do not represent the individual. The identity embedding can be generated by a machine-learning model such as a face recognition model. The identity embedding does not have a readily-discernible correspondence to the image, since the identity embedding depends on the particular configuration of the network in addition to the content of the image. Although the identity embedding does not necessarily encode sufficient information to reconstruct the exact original image from the embedding, reconstruction of an approximation of the original image from the identity embedding is generally possible. This problem involves performing operations that approximate the inverse of the operations performed by the model that generated the identity embedding.

If internal details about a face recognition model that generated the identity embedding are available, then the problem is referred to as a "clear-box inversion problem." The internal details used by "clear-box methods" that have access to internal details about the face recognition model can include neural network weights or gradients. Clear-box methods have drawbacks such as requiring more memory during training due to having to store the face recognition model weights. Clear-box method are also more difficult to adapt or extend with alternative or additional conditional signals, and tend to produce adversarial examples, e.g., images that lead to similar identity vectors but do not resemble the face from which the identity vector was generated. Further, the access to the face recognition model internal information needed by clear-box methods is not always available in practice.

If internal details about the face recognition model are not available, then the problem is referred to as an opaque-box inversion problem. Opaque-box methods have addressed the inversion problem from a security point of view. For example, a face recognition system generates an authorized identity embedding based on one or more images of an authorized user. The face recognition system can allow a person to gain access to a computing device if an identity embedding generated from an image of the person matches the authorized identity embedding with at least a threshold degree of similarity. An attacker that obtains the authorized identity embedding could potentially use a solution to the opaque-box inversion problem to generate an image of the authorized user and present the image to gain unauthorized access to the computing device. To assess the feasibility of such an attack, systems have been developed that generate an image from an identity embedding. Opaque-box methods have drawbacks such as producing image artifacts, relying on large amounts of training data, producing images that lack realism, taking a substantial amount of time to produce images, producing blurry images, or often producing images with different facial identities than the face from which the identity vector was generated.

As the foregoing illustrates, what is needed in the art are more effective techniques for generating realistic images of faces from identity embeddings while preserving the facial identities of the faces encoded in the identity embeddings.

SUMMARY

One embodiment of the present invention sets forth a technique for performing identity-preserving image generation. The technique includes converting an identity image depicting a facial identity into an identity embedding. The technique further includes generating a combined embedding based on the identity embedding and a diffusion iteration identifier. The technique further includes converting, using a neural network and based on the combined embedding, a first input image that includes first noise into a first predicted image depicting one or more facial features that include one or more first facial identity features, wherein the one or more first facial identity features correspond to one or more respective second facial identity features of the identity image and are based at least on the identity embedding.

One technical advantage of the disclosed techniques relative to the prior art is that the identity embedding generated by a face recognition model can be converted to an image of the corresponding face without having access to internal information used by the face recognition model. In this regard, the disclosed techniques can be used to train a machine learning model in a way that uses diffusion techniques to generate a realistic, sharp image of the face that closely resembles the identity of the corresponding face from which the identity embedding was extracted. Another technical advantage of the disclosed techniques is the ability to control facial features in the generated image. The controllable facial features can include one or more facial identity features and/or one or more attribute-based facial features. Facial identity features are represented by an identity embedding and include facial features that are difficult to describe with a single number or category value, such as geometric positions and dimensions of facial features. Facial identity features can represent, for example, a specific shape or position of the nose or eyes. Facial identity features are represented in the identity embedding in latent space, and although precisely specified in latent space, are not readily interpretable into specific meaningful values. Facial identity features can be varied using the techniques described herein by identifying portions of the identity embedding that correspond to the facial identity features and identifying directions in the latent space of the identity embedding that can be used to vary the corresponding facial identity features. The techniques described herein can be used to generate images in which facial identity features are varied across a range of identities having different appearances by varying the value of a portion of the identity embedding that corresponds to the facial identity feature. The controllable facial features can include one or more attribute-based facial features. Attribute-based facial features can be described with a particular number or category value, and include identity-specific features, such as emotion or head pose. Attribute-based facial features can be controlled using techniques described herein based on a specified attribute value, such as a particular head pose angle or emotion.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

Figure 1:
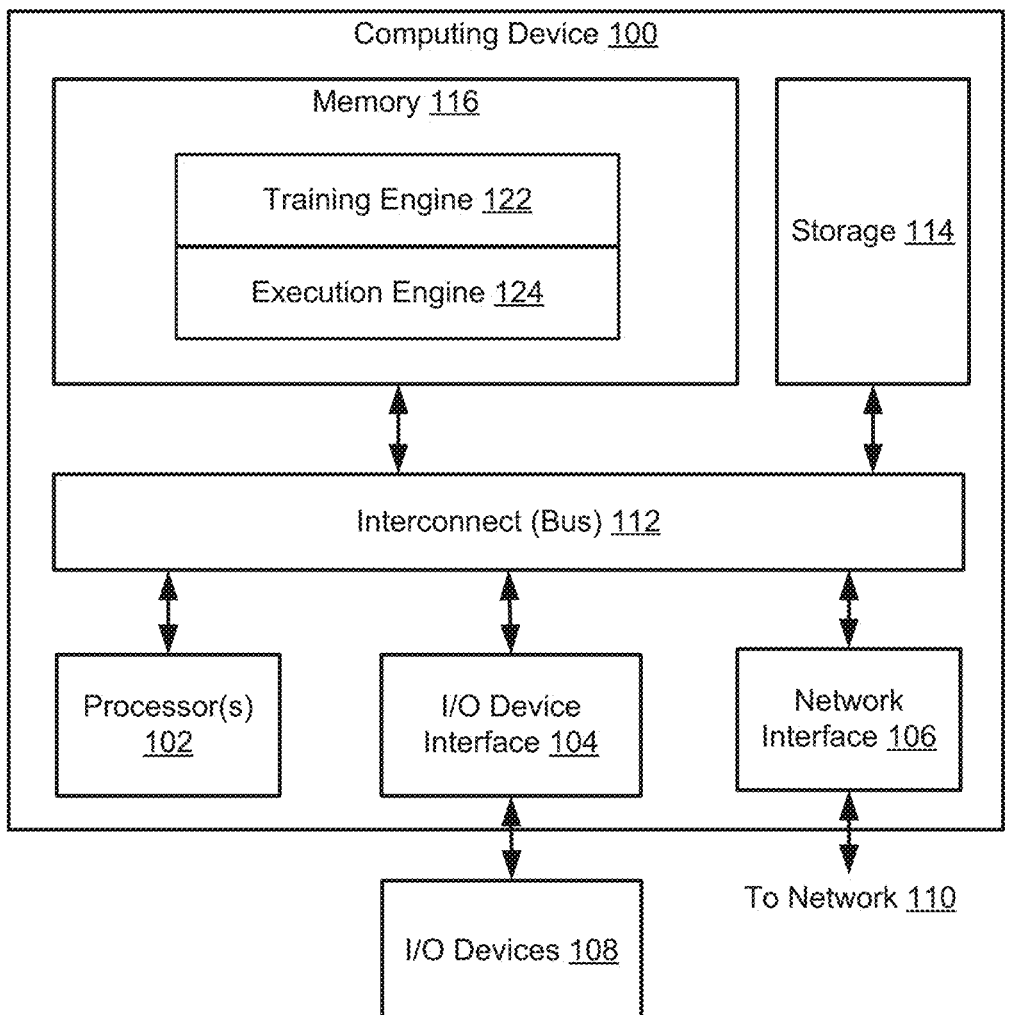
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100. In another example, training engine 122 and/or execution engine 124 could execute on various sets of hardware, types of devices, or environments to adapt training engine 122 and/or execution engine 124 to different use cases or applications. In a third example, training engine 122 and execution engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains a diffusion model for use in a sequence of diffusion iterations that iteratively remove noise from an input image until an image depicting a given identity without noise is produced. The sequence of diffusion iterations is in which an amount of noise is removed from an image is referred to herein as a "diffusion process." More specifically, a sequence of diffusion iterations that progressively remove noise is referred to as a "reverse diffusion process" and a sequence of diffusion iterations that progressively add noise to an image is referred to herein as a "forward diffusion process."

Execution engine 124 uses a trained diffusion model to perform a sequence of reverse diffusion iterations that produces an output image depicting a face based on a given identity representation. In each diffusion iteration, the execution engine 124 provides the given identity representation as input to the diffusion model. The identity representation can be an identity embedding, such as an identity vector, that represents a facial identity in a latent space. The execution engine 124 also provides an input image to the diffusion model as input in each diffusion iteration. In the first diffusion iteration, the input image can be an image of pure Gaussian noise. In each subsequent diffusion iteration, the execution engine 124 uses the diffusion model to predict the noise to remove from the image that was generated in the previous diffusion iteration. The noise predicted by the diffusion model for a noisy input image in each diffusion iteration corresponds to a scaled version of the noise that would have been added to the clean input image in a diffusion iteration of a forward diffusion process to generate the noisy input image. The execution engine 124 then converts the predicted noise to a de-noised image, which is used as input to the diffusion model in the next diffusion iteration. In the last diffusion iteration, the de-noised image depicts a face based on the given identity without noise. The de-noised image depicts a face similar to a face from which the given identity representation was generated.

Training engine 122 trains the diffusion model to predict a scaled version of the noise that would have been added to an input image in a corresponding diffusion iteration of a forward diffusion process. Training engine 122 generates each prediction based on an identity representation and the input image. Training engine 122 can train the diffusion model using any suitable technique. In some embodiments, training engine 122 uses backpropagation in a sequence of training steps that use a training technique such as gradient descent training. In each training step, training engine 122 performs a particular diffusion iteration. The particular diffusion iteration to be performed can be selected at random from the sequence of diffusion iterations that are to be performed by the execution engine 124 at inference time. For example, the training step can be specified by an iteration identifier, which can be selected based on a random number.

In the particular diffusion iteration, training engine 122 receives the iteration identifier and determines an amount of noise based on the iteration identifier using a noise schedule 246. The noise schedule can be a variance schedule that specifies a quantity of noise to be added in each iteration of a total number T of inference iterations. The total number T can be the number inference iterations 380 to be performed by execution engine 124 as described herein with respect to FIG. 3. The noise schedule 246 can specify a quantity $\beta_t$ for each iteration number t between 1 and a total number of iterations T. The variance schedule can be a linear schedule of values $\beta_t$ from $\beta_1$ to $\beta_T$ in which the quantity $\beta_t$ ranges from a value close to zero, such as $\beta_1=0.0001$, to a value such as $\beta_T=0.02$. Training engine 122 determines a weight of the noise $\overline{\alpha}_t$ based on $\beta_t$ as described below. Training engine 122 selects a clean 202 image from a set of clean images 200, and generates a noisy image by adding the determined amount of noise to the clean image. Training engine 122 provides the noisy image, a given identity representation, and the iteration identifier as inputs to the diffusion model. The diffusion model generates predicted noise based on the inputs. Training engine 122 calculates a noise reconstruction loss based on a difference between a pure noise image (e.g., depicting only noise) and the predicted noise. Training engine 122 then updates the diffusion model based on the noise reconstruction loss, e.g., by updating weights of a neural network that implements the diffusion model. Training engine 122 then selects another clean image and performs another particular diffusion iteration using the selected clean image and another randomly-selected iteration identifier. Training engine 122 performs such training steps, each including a particular diffusion iteration, until a termination condition is satisfied, e.g., a threshold number of training steps have been performed, the noise reconstruction loss is below a threshold, or other suitable condition. Although examples are described herein with reference to a diffusion model that generates predicted noise and is trained based on a noise reconstruction loss, the techniques discussed below can be also applied to other types of diffusion models that generate different types of predictions and are trained on different types of reconstruction loss. For example, the techniques described herein can be used with an image-based diffusion model that generates predicted images and is trained on an image reconstruction loss.

Figure 2A:
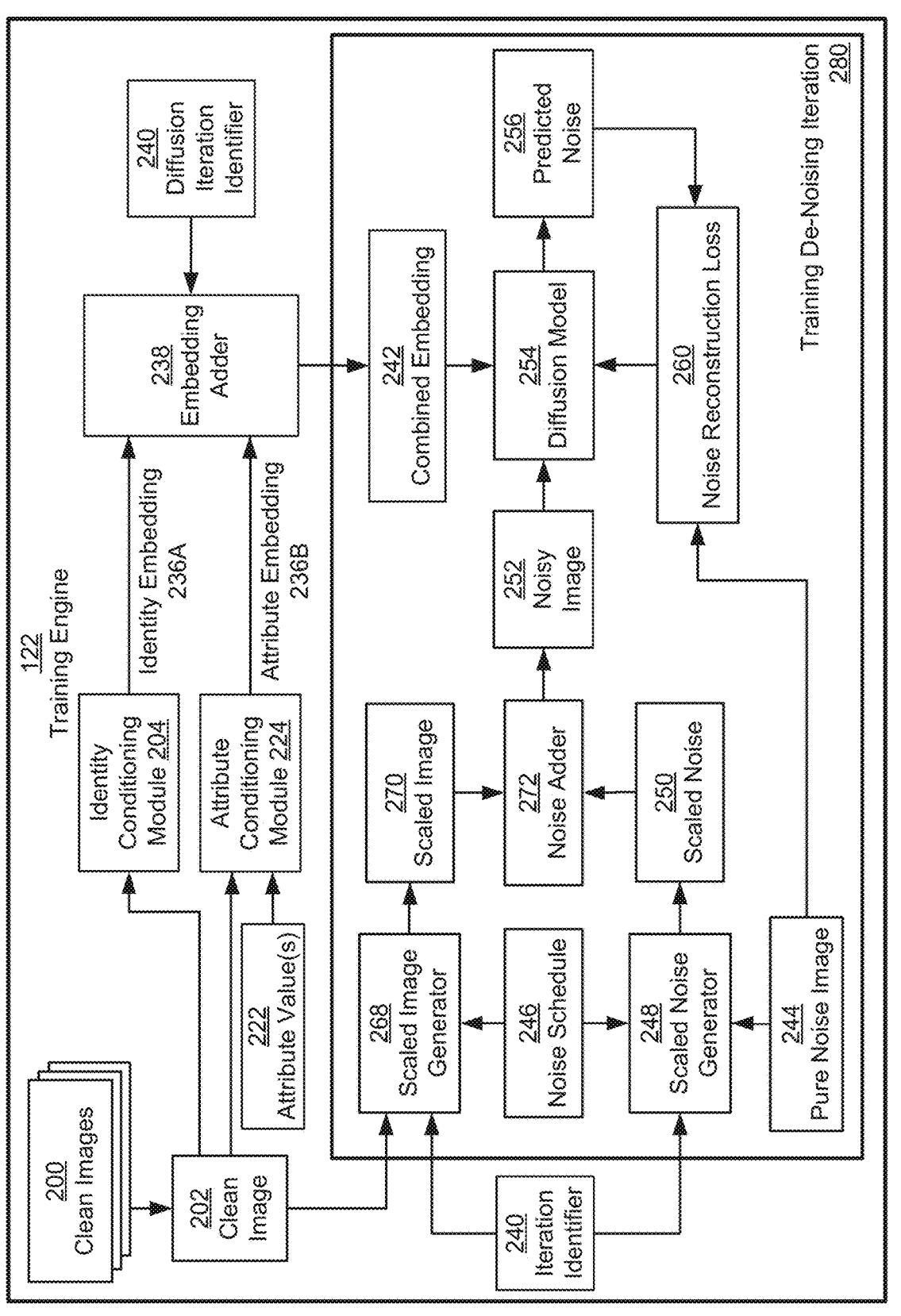
FIG. 2A is a more detailed illustration of the training engine of FIG. 1, according to various embodiments.

FIG. 2A is a more detailed illustration of the training engine 122 of FIG. 1, according to various embodiments. As mentioned above, training engine 122 operates to train a diffusion model 254 that generates a predicted noise 256, which corresponds to a scaled version of the noise that would have been added to the clean input image in a diffusion iteration of a diffusion process to generate the noisy input image. The predicted noise 256 represents an amount of noise that can be removed from a noisy image 252 (e.g., by a noise-to-image converter 306) to generate a de-noised image in which a portion of noise in the noisy image 252 is replaced by a portion of a face that resembles a given clean image 202 from which a given identity embedding 236A was generated. The diffusion model 254 can be a neural network that contains convolutional layers, residual neural network (ResNet) layers, and/or other types of neural network layers, for example.

A de-noised image 308 (shown in FIG. 3) can depict one or more facial features such as eyes, ears, mouth, nose, eyebrows, eyelashes, teeth, and hair, for example. The facial features can include one or more facial identity features and/or one or more attribute-based facial features. Each of the facial features can correspond to a respective facial identity feature of the clean image 202, and can be based at least on the identity embedding 236A. The facial identity features can be correlated with identity. Facial identity features strongly correlated with identity include facial hair, hair, hair color, and gender. Facial identity features correlated with identity to a medium extent include age, glasses, makeup, and occlusion. Facial features that are not correlated or are largely uncorrelated with identity include head pose and emotion.

Figures 2B, 2C:
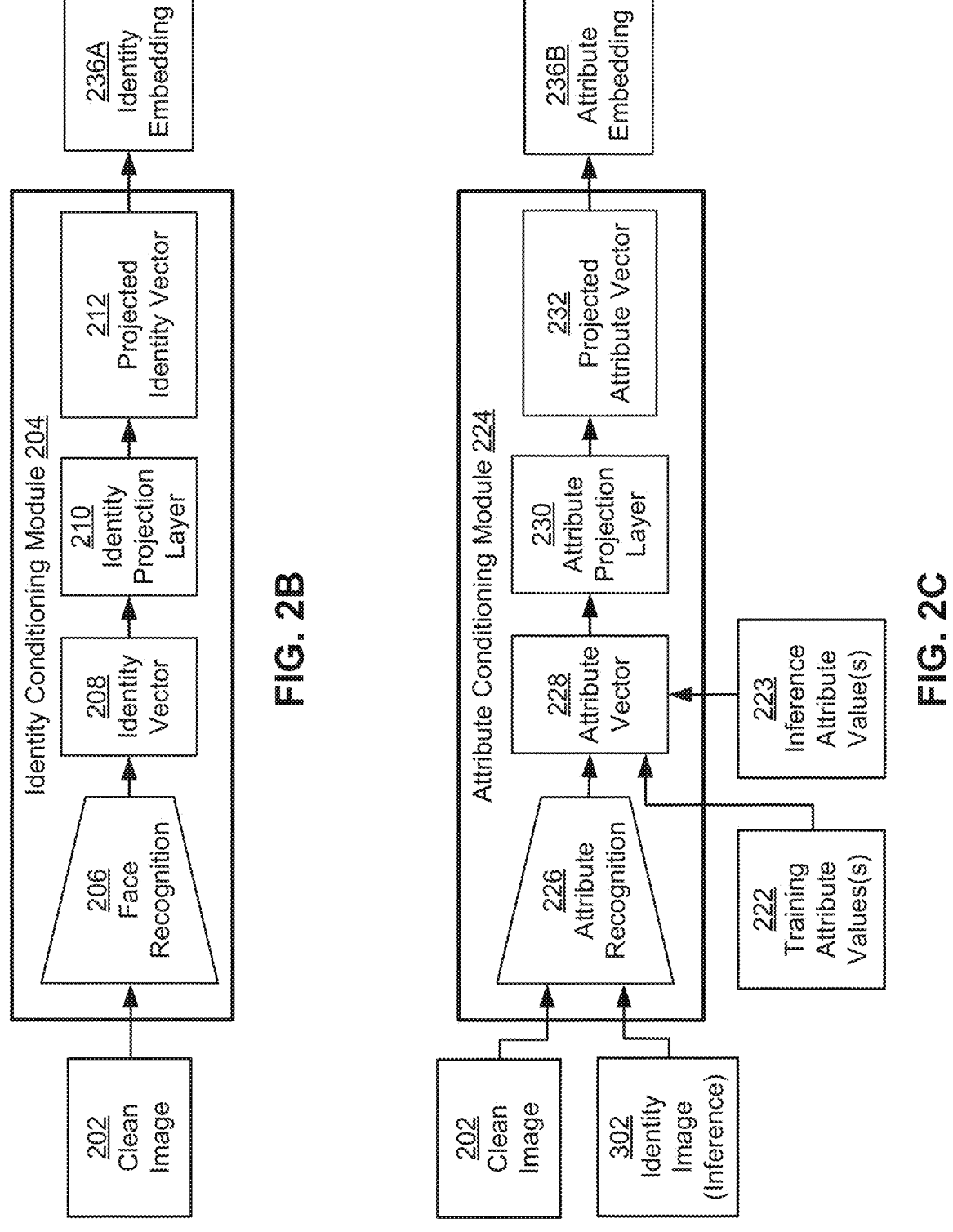
FIG. 2B illustrates an identity conditioning module, according to various embodiments.
FIG. 2C illustrates an attribute conditioning module, according to various embodiments.

Non-identity facial features such as head pose and emotion can be controlled with attribute conditioning, which uses attribute conditioning module 224, instead of identity conditioning, which uses identity conditioning module 204. For example, a person with a different head pose angle can still be the same person, so head pose angle is a non-identity facial feature. Although attribute values can be contained in the identity embedding, controlling attributes by traversing the latent space of the identity embedding is more difficult than controlling attributes by setting attribute values contained in a separate attribute embedding. Facial identity features such as face, eye, and/or nose shape are difficult to describe precisely using attribute values, and training data that correlates certain attributes (such as face, eye, or nose shape) with images can be difficult to obtain. Thus, facial identity features that are difficult to describe precisely using attribute values and/or for which training data is difficult to obtain, such as face, eye, and/or nose shape, are represented using identity encodings generated by the face recognition model 206 of the identity conditioning module 204, as described above. Some facial identity features, such as age, gender, or hair color, can be represented both as attribute values and in an identity embedding. In some embodiments, attributes that are identity-independent, such as pose, emotion, and the like, are used with attribute conditioning when the attribute embedding 236B is combined with the identity embedding 236A (e.g., via the embedding adder 238). Using attributes that do not affect identity can prevent conflicts between the attribute values and the identity embedding in the diffusion model 254. Thus, attribute conditioning can be performed to condition the diffusion model 254 on an attribute embedding 236B that is based on non-identity attributes in addition to the identity embedding 236A. Alternatively, attribute conditioning can be performed to condition the diffusion model 254 on an attribute embedding 236B that is based on identity attributes and non-identity attributes without performing identity conditioning. Referring to FIGS. 2A and 2C, the diffusion model 254 can be conditioned on the attribute embedding 236B obtained by passing a vector of training attribute values 222 (e.g., pose, emotion, and other non-identity attributes, either available as a label or by passing clean image 202 through an attribute recognition model 226), through an attribute projection layer 230 (e.g., a fully connected layer) during training. The attribute recognition model can be a neural network, for example. During inference, the attributes in the output of the diffusion model can be controlled by setting the desired inference attribute values 223, which can be stored in the attribute vector 228. During training, the training attribute value(s) 222 are included in the attribute vector 228. During inference, the inference attribute value(s) are included in the attribute vector 228. Further, during training, clean image 202 is provided as input to attribute recognition model 226, and during inference, identity image 302 is provided to the attribute recognition model 226. During inference, input attribute values 223 that are not depicted in the identity image 302 can be included in attribute vector 228 to control the attribute that corresponds to the inference attribute values 223. Facial features represented by attributes, referred to herein as attribute-based facial features, can include, but are not limited to identity-independent features such as emotion and head pose. Attribute-based facial features can also include features that are correlated with identity to a medium extent, such as age, glasses, makeup, and/or occlusions, as well as features that can be correlated with identity such as age, facial hair, hair, hair color, and/or gender.

Facial features can also be generated based on training attribute values 222 during training, or based on inference attribute values 223 at inference time. Training attribute values 222 and/or inference attribute values 223 can be stored in an attribute vector 228. The attribute vector 228 can be generated by attribute recognition model 226 based on clean image 202 and/or inference attribute values 223 included in an attribute vector 228. The attribute vector 228 can be included in an attribute embedding 236B by an attribute projection layer 230. If an attribute embedding 236B is provided as input to the diffusion model 254, then the portion of the face also has one or more features specified in the attribute embedding 236B. If the identity embedding 236A generated by the identity conditioning module 204 is being used in combination with the attribute embedding 236B generated by the attribute conditioning module 224, then the attribute-based facial features should be identity-independent attributes such as emotion and/or head pose to avoid conflicts with facial identity features encoded in the identity embedding 236A. Alternatively, if the attribute embedding 236B is being used without the identity embedding 236A, then the attribute facial features can include identity-related facial features such as glasses, makeup, age, or facial hair, for example. The training attribute values 222 and/or inference attribute values 223 can be extracted from clean images 200 using a neural network such as attribute recognition model 226 for example. The inference attribute values 223 can be determined from labels provided by a user for a clean image 202.

Example attribute types include emotion, head pose, glasses, makeup, age, or facial hair. Example attribute values 222, 223 can include an emotion value (e.g., happy), a head pose value (e.g., three angles), a glasses value (e.g., yes or no), a makeup value, an age value, or a facial hair value. The glasses value can be mapped to a value such as 0 (no) or 1 (yes), and the value can be concatenated with or stored in an element of attribute vector 228. The position of the element in the attribute vector 228 can corresponds to the attribute type (glasses), and the value of the element can be set to 0 if the generated facial image is not to depict glasses, or 1 if the generated facial image is to depict glasses.

Training engine 122 trains the diffusion model 254 on one or clean images 200 by performing a training de-noising iteration 280 ("de-noising iteration") for each clean image 202 in the clean images 200. To perform a de-noising iteration 280, training engine 122 generates a noisy image 252 based on a clean image 202 and a combined embedding 242 as described herein, and converts the noisy image 252 to predicted noise 256 using a diffusion model 254. Training engine 122 then determines a noise reconstruction loss 260 using a loss function that computes a difference between the predicted noise 256 and a pure noise image 244, and updates the diffusion model 254 based on the noise reconstruction loss 260.

To generate the combined embedding 242, training engine 122 selects a clean image 202 from clean images 200 and provides the clean image 202 to an identity conditioning module 204 and, optionally, to an attribute conditioning module 224. Identity conditioning module 204 generates an identity embedding 236A from clean image 202, as shown in further detail in FIG. 2B. Identity embedding 236A can be a vector in a latent space, for example.

Attribute conditioning module 224, if present, generates an attribute embedding 236B from clean image 202 and/or one or more training attribute values 222 and/or inference attribute values 223, as shown in further detail in FIG. 2B. Attribute embedding 236B can be a vector in a latent space, for example.

An embedding adder 238 computes a combined embedding 242 based on identity embedding 236A, attribute embedding 236B (if present), and diffusion iteration identifier 240. The diffusion iteration identifier 240 can be a random number between 1 and a number of iterations T that would remove the noise from the pure noise image 244. For example, the diffusion iteration identifier 240 can be a random value selected from a uniform distribution. The number representing the time step can be passed through positional encoding (sines and cosines) to generate a high-dimensional vector. The high-dimensional vector can then be passed through one or more fully connected layers to generate a time step embedding that is included in the combined embedding 242 by the embedding adder 238. The training engine 122 can perform a single de-noising iteration 280 using a single random diffusion iteration identifier 240. In some embodiments, training engine 122 uses backpropagation in a sequence of training steps that use a training technique such as gradient descent training. One execution of de-noising iteration 280 is sufficient for each training step that uses a particular clean image 202 from clean images 200. In other words, training engine 122 can provide a different clean image 202 of clean images 200 in each training step, and each training step can perform one execution of the de-noising iteration 280. In other embodiments training engine 122 can perform T iterations and update diffusion model 254 in each iteration based on an amount of loss determined in the iteration. Training engine 122 performs training steps until a termination condition is satisfied. For example, the termination condition can be satisfied after a threshold number of training steps have been performed. For example the threshold number of training steps can be determined based on a number of batches and a batch size. The number of batches can be e.g., 100,000, 150,000, or other suitable number. The batch size can be, for example, 64, which can correspond to 64 megabytes of images, or 128, which can correspond to 128 megabytes of images.

Figure 3:
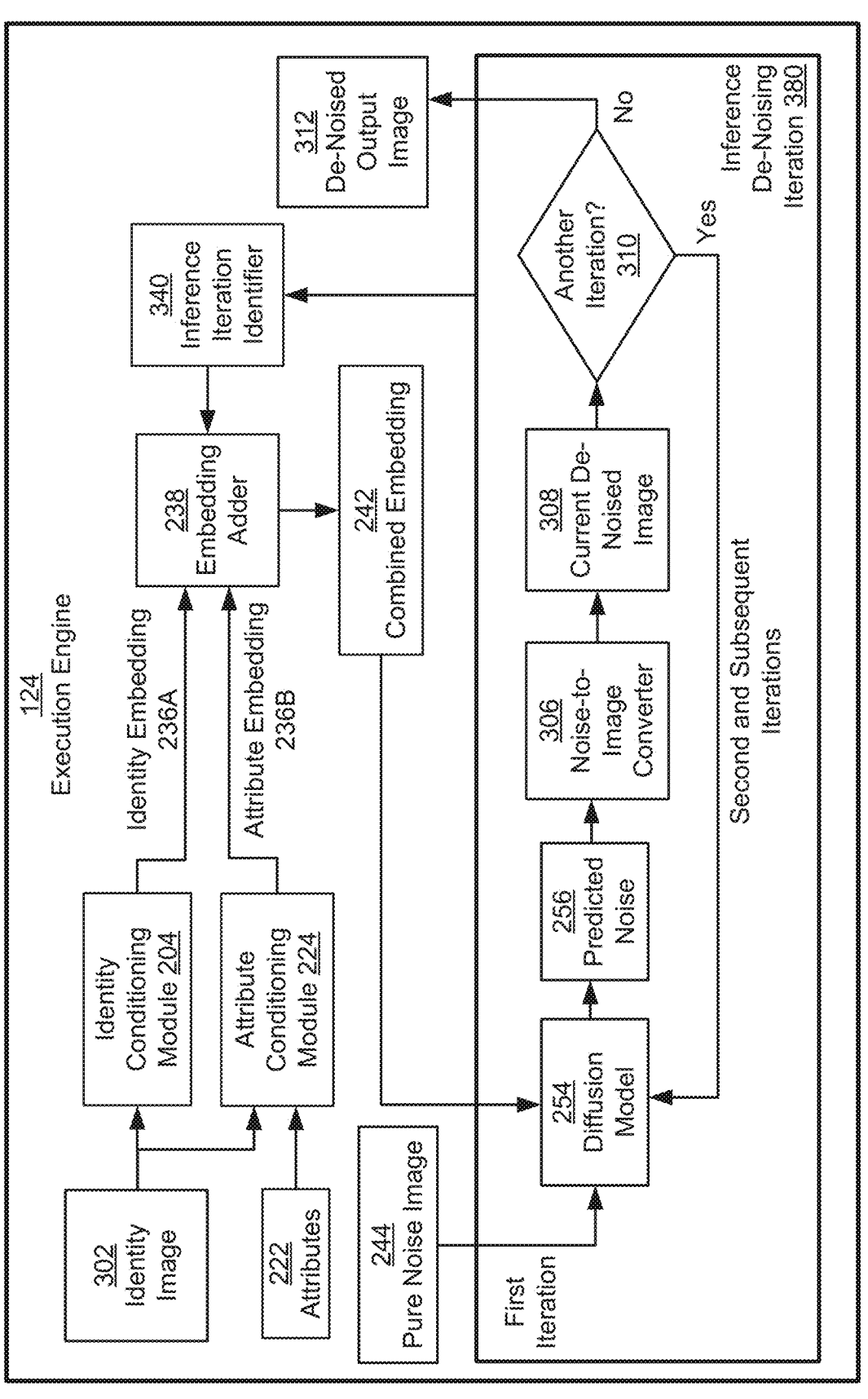
FIG. 3 is a more detailed illustration of the execution engine of FIG. 1, according to various embodiments.

Training engine 122 determines a diffusion iteration identifier 240, e.g., by generating a random number between 1 and the total number T of inference iterations 380 to be performed by execution engine 124 as described herein with respect to FIG. 3. Although the diffusion iteration identifier 240 is described as an iteration number in examples described herein, the diffusion iteration identifier 240 can be any suitable identifier that corresponds to an amount of noise to be added to the clean image 202 in a particular de-noising iteration 280. The amount of noise to be added is determined based on a noise schedule 246, which specifies the amount of noise to be added in each iteration as a decimal value between 0 and 1.0.

Embedding adder 238 converts the diffusion iteration identifier 240 to an iteration identifier embedding and generates the combined embedding 242 as a sum of the identity embedding 236A, the attribute embedding 236B, and the iteration identifier embedding. The iteration identifier embedding can be a diffusion iteration identifier 240 in latent space, for example.

Training engine 122 generates a noisy image 252 for use as input to a diffusion model 254. The noisy image 252 is generated as a weighted sum of the clean image 202 and a pure noise image 244. A scaled image generator 268 generates a scaled image 270 by multiplying the weight of the clean image by the clean image 202. The weight of the clean image is determined by a weight that is based on the diffusion iteration identifier 240. Scaled noise 250 is generated by a scaled noise generator 248, which multiplies the weight of the noise by a pure noise image 244. The weight of the noise is determined as 1 minus the weight of the clean image.

The term "pure noise image" herein refers to an image of pure Gaussian noise. For example, the pure noise image 244 can include noise only. The pure noise image 244 can have a height and width in pixels that match the height and width of the clean image 202. Each pixel of the pure noise image 244 can have a value determined according to a Gaussian noise distribution, other suitable distribution, or other form of random noise. Noise can be added to or included in an image by adding noise values to pixels or replacing pixel values with noise values. The term "content" herein refers to a non-random, e.g., non-noise, portion of an image. Content can be meaningful detail, such as at least a portion of an image of a face.

Training engine 122 determines the weight of the noise based on a noise schedule 246, which is a variance schedule that specifies a quantity $\beta_t$ for each iteration number t between 1 and a total number of iterations T. The variance schedule can be a linear schedule of values $\beta_t$ from $\beta_1$ to $\beta_T$ in which the quantity $\beta_t$ ranges from a value close to zero, such as $\beta_1=0.0001$, to a value such as $\beta_T=0.02$. Training engine 122 determines the weight of the noise $\overline{\alpha}_t$ based on $\beta_t$. The noise weight $\overline{\alpha}_t$ can be determined based on an entry $\beta_t$ that corresponds to iteration t in a noise schedule $\beta$. For example, at $\alpha_t=1-\beta_t$ and $\overline{\alpha}_t$ is a product of the $\alpha_s$ values for s ranging from 0 to t. Scaled image generator 268 generates the scaled image 270 by multiplying the clean image 202 by the noise weight $\overline{\alpha}_t$. For example, scaled image generator 268 can multiply each pixel of clean image 202 by the noise weight $\overline{\alpha}_t$. Further, scaled noise generator 248 generates the scaled noise 250 by multiplying the pure noise image 244 by $1-\overline{\alpha}_t$. For example, scaled noise generator 248 can multiply each pixel of the pure noise image 244 by the noise weight $\overline{\alpha}_t$.

A noise adder 272 adds the scaled noise 250 to the scaled image 270 to produce the noisy image 252. Training engine 122 provides the noisy image 252 to the diffusion model 254 as input, and the diffusion model 254 generates predicted noise 256 based on the noisy image 252. Training engine 122 trains diffusion model 254 based on a noise reconstruction loss 260. The noise reconstruction loss 260 represents a difference between the predicted noise 256 and the pure noise image 244. The diffusion model 254 is trained to replace a portion of noise in a noisy image 252 with a portion of a face that is similar to a face depicted in a clean image 202 having an embedding specified by identity embedding 236A.

To train the diffusion model 254, training engine 122 computes the noise reconstruction loss 260 based on the predicted noise 256 and the pure noise image 244. The noise reconstruction loss 260 represents a difference between the pure-noise image 244 and a predicted noisy image 252. The noise reconstruction loss 260 can be computed based on a loss function according to the following formula:

$$\mathcal{L}_{simple} = \left[ \|\epsilon - \epsilon_\theta(x_t, y, t)\|^2 \right].$$

In the calculation of the loss $\mathcal{L}_{simple}$, $\epsilon$ represents the pure noise image 244, $\epsilon_\theta(x_t,y,t)$ represents the predicted noise 256, $x_t$ represents the noisy image 252 determined as a weighted sum of $\epsilon$ and $x_t$ using a noise weight $\overline{\alpha}_t$ as described herein above, y represents the identity embedding 236A, and t is a latent-space embedding of a random diffusion iteration identifier 240 having a valid iteration number (e.g., between 1 and a total number of iterations T). Diffusion model 254 predicts the noise $\epsilon_\theta(x_t,y,t)$. The loss function subtracts the predicted noise $\epsilon_\theta(x_t,y, t)$ from the pure-noise image $\epsilon$. In each training step, the training engine 122 uses the loss computed by the loss function in a training process, e.g., backpropagation using gradient descent training steps, to update the diffusion model 254. Updating the diffusion model 254 can include updating weights of a neural network based on the loss. The updated diffusion model 254 predicts a predicted noise 256 from which some portion of noise would be removed at iteration t. The updating of the diffusion model 254 based on the noise reconstruction loss 260 is shown by an arrow from the noise reconstruction loss 260 to the diffusion model 254 in FIG. 2A.

In some embodiments, the noise reconstruction loss 260 is independent of the identity. That is, there is no need to determine an identity loss. Since determining an identity loss involves substantial computation time and memory use, the disclosed identity-independent training technique is more efficient in terms of time and memory use than other techniques that determine a loss based on identities. In other embodiments, an identity loss (not shown) can be determined by converting the predicted noise 256 to a predicted clean image (not shown) using a suitable operation such as that performed by the noise-to-image converter 306 of FIG. 3. The face recognition model 206 shown in FIG. 2B can be used to generate a predicted identity vector (not shown) based on the predicted clean image. The training engine 122 can compare the predicted identity vector to the ground-truth identity vector 208 shown in FIG. 2B. The training engine 122 can then update the diffusion model 254 based on an amount of identity loss computed between the predicted identity vector and the ground-truth identity vector 208. The identity loss can be computed based on a numeric difference between the predicted identity vector and the identity vector 208, for example. The training engine 122 can update the diffusion model 254 based on the identity loss, the noise reconstruction loss 260, or both the identity loss and the noise reconstruction loss 260.

In some embodiments, each clean image 202 includes a normalized image of a face associated with identity embedding 236A. This face can include (but is not limited to) a human face, an animal face, an animated face, a computer-generated face, and/or another representation of a region of a head that can be used to uniquely identify a human or non-human individual. Within the normalized image, landmarks or features of the face are aligned to match landmarks of a generic face with a neutral expression. As a result, facial features (e.g., eyes, ears, nose, etc.) are at similar locations across the normalized images. The normalized image can also be cropped to a predefined size. To generate the normalized image, training engine 122 and/or execution engine 124 can rotate, scale, translate, crop, and/or otherwise process an original "non-normalized" image, such as an image of the face captured by a camera. Training engine 122 and/or execution engine 124 can also, or instead, use a deep alignment network (DAN) (or another technique or machine learning model) to detect the largest face in each image 202 and determine the locations of facial landmarks in the largest face. Training engine 122 and/or execution engine 124 can then rotate, translate, crop, scale, and/or otherwise transform or process the image so that the eyes of the largest face lie on a predefined horizontal line and have a predefined ocular distance.

Although examples are described herein with reference to a diffusion model that generates predicted noise and is trained based on a noise reconstruction loss, the techniques discussed below can be also applied to other types of diffusion models that generate different types of predictions and are trained on different types of reconstruction loss. For example, the techniques described herein can be used with an image-based diffusion model that generates predicted images and is trained on an image reconstruction loss. An image-based training engine can train an image-based diffusion model by using a forward noise-introducing diffusion process to generate a forward sequence of images that starts with a clean image depicting a face and has subsequent images with increasing amounts of noise ("noisiness"), until the last image, in which the face has been completely replaced with noise. The image-based training engine then reverses the forward sequence to produce a reverse sequence in which the images are sorted in decreasing order of noisiness. The image-based training engine performs a reconstruction process that trains the image-based diffusion model using a sequence of iterations. Each iteration trains the image-based diffusion model to predict the next image in the reverse sequence. In each iteration, the image-based training engine computes an image reconstruction loss between the predicted image and the actual next image. The diffusion model is updated based on the image reconstruction loss.

FIG. 2B illustrates an identity conditioning module 204, according to various embodiments. The identity conditioning module 204 generates an identity embedding 236A based on a given clean image 202. To generate the identity embedding 236A, the identity conditioning module 204 provides the clean image 202 to a face recognition model 206, which generates an identity vector 208. The face recognition model 206 can be neural network, and the identity vector 208 can be in a latent space, for example. The identity conditioning module 204 then provides the identity vector 208 to an identity projection layer 210, which generates a projected identity vector 212. The identity projection layer 210 can be a fully-connected layer that converts the attribute vector 228 from a vector of length N to a vector of length M to match the length of the diffusion iteration identifier embedding (e.g., M) so that the vectors can be combined. For example, the identity projection layer 210 can convert the identity vector 208 from a dimensionality of 512 to a dimensionality of 768 if the iteration identifier embedding has a dimensionality of 768. The identity conditioning module 204 outputs the projected identity vector 212 as an identity embedding 236A.

FIG. 2C illustrates an attribute conditioning module 224, according to various embodiments. The attribute conditioning module 224 generates an attribute embedding 236B based on a given clean image 202 and/or one or more given attribute values 222. To generate the attribute embedding 236B, the identity conditioning module 204 provides the clean image 202 and the attribute embedding 236B to an attribute recognition model 226, which generates an attribute vector 228. The attribute recognition model 226 can be neural network, and the attribute vector 228 can be in a latent space, for example. The attribute conditioning module 224 then provides the attribute vector 228 to an attribute projection layer 230, which converts the attribute vector 228 to a projected attribute vector 232 having the same dimensionality as the iteration identifier embedding. The attribute conditioning module 224 outputs the projected attribute vector 232 as an attribute embedding 236B.

FIG. 3 is a more detailed illustration of the execution engine 124 of FIG. 1, according to various embodiments. The execution engine 124 executes a de-noising diffusion model 254 that removes a portion of noise from a pure noise image 244 in a sequence of inference de-noising iterations 380 to generate an output image 312 depicting a face based on a given identity embedding 236A. The identity embedding 236A includes a representation of facial features derived from a given face depicted in an input identity image 302 that was provided as input to a face recognition model 206. By generating an output image 312 depicting a face based on a given identity embedding 236A, the diffusion model 254 performs an operation analogous to the inverse of the face recognition operation performed by the face recognition model 206.

Execution engine 124 can receive an input identity image 302 depicting a given face and uses identity conditioning module 204 to convert the input identity image 302 to an identity embedding 236A. Alternatively, execution engine 124 can receive the identity embedding 236A instead of the input identity image 302. Execution engine 124 can also use attribute conditioning module 224 to convert the input identity image 302 and one or more attribute values 222 and/or 223 (shown in FIG. 2C) to an attribute embedding 236B. Execution engine 124 provides the identity embedding 236A and the attribute embedding 236B (if present) to an embedding adder 238, which combines the identity embedding 236A and attribute embedding 236B with an iteration identifier embedding to produce a combined embedding 242. The iteration identifier embedding is generated by converting an inference iteration identifier 340 to latent space. The inference iteration identifier 340 can be an iteration number of a de-noising iteration 380. For example, the inference iteration identifier 340 can range from a number T corresponding to a total number of diffusion de-noising iterations 380 that are performed to generate the de-output noised image 312 down to 1. The number of diffusion iterations de-noising iterations 380 can be, e.g., 500 (T=500), 1000, 2000, or other suitable number of iterations. The combined embedding 242 can be a sum of the identity embedding 236A, the attribute embedding 236B, and iteration identifier embedding, for example.

Execution engine 124 executes a sequence of inference de-noising iterations 380. In each inference de-noising iteration 380, the execution engine 124 uses a diffusion model 254 to generate predicted noise 256. Execution engine 124 converts the predicted noise 256 to a current de-noised image 308. For example, execution engine 124 removes noise from an image and replaces the removed noise with a portion of a face that is similar to a face depicted in the identity image 302. The number of inference de-noising iterations 380 can be the same as the total number T of training de-noising iterations 280 used as the upper limit on the random diffusion iteration identifier 240 by the training engine 122 to train the diffusion model 254. As herein described with respect to FIG. 2A, the training engine 122 does not necessarily perform T training de-noising operations 280. Instead, the training engine 122 can perform a single inference de-noising iteration 380 using the random diffusion iteration identifier 240. Alternatively, the number of inference de-noising iterations can be lower than the total number T of training diffusion iterations 280 performed by training engine 122. For example, the number T can be 1000 iterations, in which case the number of inference de-noising operations can be 250 iterations.

In the first inference de-noising iteration 380, execution engine 124 provides the pure noise image 244 to the diffusion model 254 as input. The diffusion model 254 generates predicted noise 256 based on the pure noise image 244 and the combined embedding 242. A noise-to-image converter 306 converts the predicted noise 256 to a current de-noised image 308. The noise-to-image converter 306 can convert the predicted noise 256 to the current de-noised image 308 using a formula such as the following:

$$x_{t-1} = \frac{1}{\sqrt{\alpha_t}}\left(x_t - \frac{1-\alpha_t}{\sqrt{1-\overline{\alpha}_t}}\epsilon_\theta(x_t, t)\right)$$

This noise-to-image conversion formula can also include a noise term (not shown) that adds a small amount of noise in each iteration except the last iteration. The current de-noised image 308 has less noise than the image that was provided to the diffusion model 254 as input (e.g., the pure noise image 244 in the first inference de-noising iteration 280, or for subsequent iterations, the de-noised image 308 generated in the previous iteration 380). The current de-noised image 308 can depict one or more facial features. The one or more facial features can correspond to one or more respective facial identity features of the identity image 302 and are based at least on the identity embedding 236A.

The execution engine 124 determines at condition block 310 whether to execute another inference de-noising iteration 380 after generating the current de-noised image 308. For example, at condition block 310, the execution engine 124 can determine whether a threshold termination condition is satisfied. The termination condition can be satisfied if the number of iterations 380 executed is greater than or equal to a threshold number of inference de-noising operations. If the termination condition is not satisfied, then execution engine 124 performs another de-noising iteration 380 by providing the current de-noised image 308 and the combined embedding 242 to the diffusion model 254 as input.

In the next de-noising iteration 380, diffusion model 254 generates a new predicted noise 256, and the noise-to-image converter 306 generates a new current de-noised image 308. That is, in the second and subsequent iterations, the diffusion model 254 receives the current de-noised image 308 from the previous iteration as input, and generates a predicted noise 256. In each subsequent de-noising iteration 380, the execution engine 124 determines at conditional block 310 whether to execute another de-noising iteration 380. If the conditional block 310 determines that another iteration is to be executed, then the execution engine 124 executes diffusion model 254 again with the current de-noised image 308 and combined embedding 242 as input.

If the conditional block 310 determines that another iteration is not to be executed, then the conditional block 310 causes the execution engine 124 to generate a de-noised output image 312, which can be the current de-noised image 308 generated in the last de-noising iteration. The execution engine 124 can then output the de-noised output image 312. The de-noised output image 312 has no noise and depicts a face similar to the given face in the identity image 302 that was used by the face recognition model (and other components of the identity conditioning module 204) to generate the identity embedding 236A.

The diffusion model 254, which is conditioned on identity information as described above, can be controlled by modifying the identity embedding 236A based on interpolation between different identity embeddings. The identity represented by an identity vector 208, or by an identity embedding 236A, can be controlled by interpolating between two identity embeddings A and B using a weight factor f between 0 and 1.0. Identity embedding A is weighted by a first weight such as f, and identity embedding B is weighted by a second weight such as 1–f. The new identity can be calculated as a weighted average using a linear interpolation fA+(1–f)B. In another example a spherical interpolation can also be used to interpolate between two identities.

As an example of linear interpolation, a combination of two different faces having two different identity embeddings A and B, respectively, can be generated by computing a interpolated identity embedding based on a weighted average of the two identity embeddings A and B using a value of f such as 0.25. When the average identity embedding is provided as input to the diffusion model by the execution engine, the de-noised output image 312 depicts a combination of the faces that were used to generate the two identity embeddings. A first degree of similarity of one or more identity features of the interpolated identity is related to the first weight, and a second degree of similarity of the one or more identity features of the interpolated identity is related to the second weight. For example, if the first weight is f=0.25 and the second weight is 1–f=0.75, then the first degree of similarity of the identity features is 0.25, which indicates that the facial features of the first identity have a weight of 0.25 (e.g., 25%) in an output image generated from the interpolated identity. Further the facial features of the second identity have a weight of 0.75 (e.g., 75%) in the output image generated from the interpolated identity. Thus, facial identity features can be controlled by performing vector arithmetic on two identity embeddings. Further, attribute-related facial features can be controlled by performing vector arithmetic on two attribute embeddings. Identity-related features such as age, hair color, gender, or glasses can be included in the output image 312 by identifying a direction in latent space for the feature using metadata for the data set on which the diffusion model is trained. The facial features output by the diffusion model, such as age depicted in the output image 312, can be controlled by changing the portion of the identity embedding that corresponds to the feature along the identified direction. The portion of the identity embedding can be modified to generate a modified identity embedding that represents a different facial identity.

A set or range of valid values can be determined for an identity feature, and a particular value for the identity feature can be selected from the set or range of values. For example, hair color can be varied across a range of colors by changing the portion of the identity embedding that corresponds to hair color. The identity embedding can be represented as a vector, which is referred to herein as an identity vector. The portion of the identity vector that corresponds to a particular identity feature can be changed by adding or subtracting a numeric value. The amount by which a depiction of the identity feature in an image changes is related to (e.g. proportional to) the size of the added or subtracted numeric value. Adding or subtracting the numeric value changes the value of the identity feature along a direction in latent space. The direction, which corresponds to an identity feature, can be identified using metadata for a data set on which the diffusion model is trained. To change the depicted feature by a particular amount, e.g., to change the color of hair depicted in a predicted image, the execution engine 124 updates the identity embedding by adding a determined value to the identity embedding and converting, using a neural network and based on the identity embedding, an image that includes noise into a predicted image depicting a modified facial identity feature that has changed by an particular amount that corresponds to the determined value. Attribute-based facial features output by the diffusion model, such as emotion depicted in the output image 312, can also be controlled by changing the portion of the attribute embedding 236B that corresponds to the feature along an identified direction.

Facial features in the output image 312 that are identity-independent can be represented as attributes, and the diffusion model can be conditioned on the attributes. An attribute conditioning model converts the attributes to an attribute embedding. The attribute embedding that can be combined with the identity vector, and facial features represented by the attributes can be included in the output image 312. The control technique described above for the identity embedding can be used to control the generation of facial features represented by the attributes that are identity-agnostic, such as emotion and head pose. Additionally or alternatively, each of the attributes values in the attribute vector 228 has a meaning that corresponds to an attribute of the de-noised output image 312. For example, the attribute vector 228 can include three numbers for the head pose yaw, pitch, and roll angles, respectively. The head pose can be controlled by setting the yaw, pitch, and roll values in the respective elements of the identity vector 208.

Although examples are described herein with reference to a diffusion model that generates predicted noise and is trained based on a noise reconstruction loss, the techniques discussed below can be also applied to other types of diffusion models that generate different types of predictions and are trained on different types of reconstruction loss. For example, the techniques described herein can be used with an image-based diffusion model that generates predicted images. An image-based execution engine can use a trained image-based diffusion model to perform a sequence of reverse diffusion iterations that produces an output image depicting a face based on a given identity representation. In each iteration, the image-based execution engine provides the given identity representation as input to the image-based diffusion model. The identity representation can be an identity embedding, such as an identity vector, that represents a facial identity in a latent space. The image-based execution engine also provides an input image to the diffusion model as input in each iteration. In the first iteration, the input image can be an image of pure Gaussian noise. In each subsequent iteration, the image-based execution engine uses the image-based diffusion model to predict the noise to remove from the image that was generated in the previous iteration. The noise predicted by the image-based diffusion model for an input image in each iteration corresponds to an amount of noise that would have been added to the input image in an iteration of a forward diffusion process to generate the input image. The image-based execution engine then converts the predicted noise to a de-noised image, which is used as input to the image-based diffusion model in the next iteration. In the last iteration, the de-noised image depicts a face based on the given identity without noise. The de-noised image depicts a face similar to a face from which the given identity representation was generated.

Figure 4:
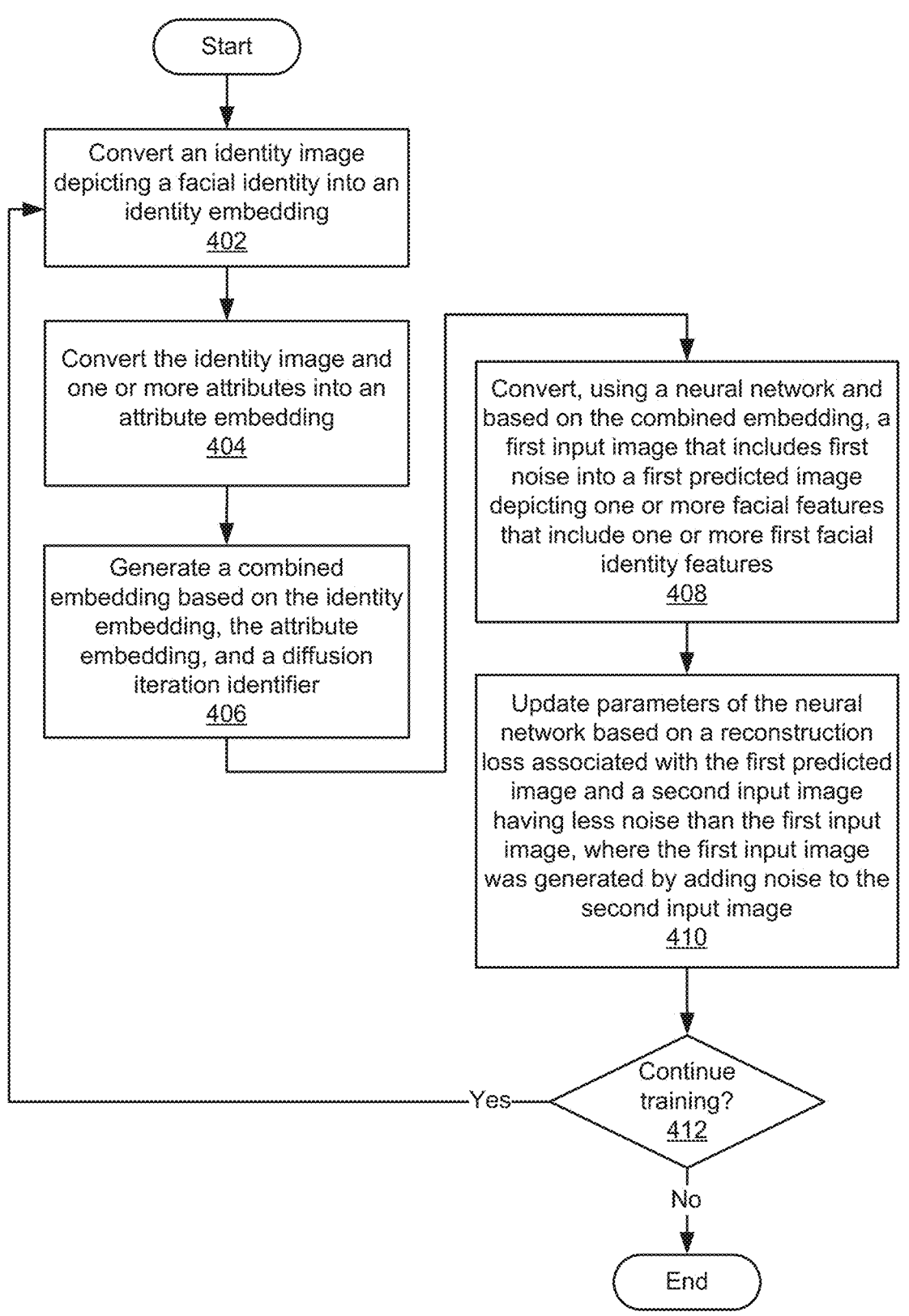
FIG. 4 is a flow diagram of method steps for training a neural network to generate de-noised images from an identity embedding, an attribute embedding, and iteration identifiers, according to various embodiments.

FIG. 4 is a flow diagram of method steps for training a neural network to generate de-noised images from an identity embedding, an attribute embedding, and iteration identifiers, according to various embodiments. Although the method steps are described in conjunction with the systems of FIGS. 1-2C, persons skilled in the art will understand that any system configured to perform the method steps in any order falls within the scope of the present disclosure.

As shown, in step 402, training engine 122 converts an identity image depicting a facial identity into an identity embedding. As an example, the training engine 122 can execute a face detector that converts the identity image into an identity embedding. In step 404, training engine 122 converts the identity image and/or one or more attributes into an attribute embedding. For example, training engine 122 can convert the identity image and one or more attributes into the attribute embedding using an attribute detector.

In step 406, training engine 122 generates a combined embedding based on the identity embedding 236A, the attribute embedding 236B, and a diffusion iteration identifier 240. The training iteration identifier 240 can be a random number between 1 and a number of iterations T that would remove the noise from the pure noise image 244. For example, the diffusion iteration identifier 240 can be a random value selected from a uniform distribution. The training engine 122 can perform a single iteration de-noising iteration 280 using diffusion iteration identifier 240 instead of performing T iterations. As an example, training engine 122 can convert the training iteration identifier 240 into an iteration identifier embedding using a suitable encoder, e.g., a positional encoding neural network in which the encoding is based on a series of sine or cosine waves having different frequencies. The positional encoding can be followed by one or more dense layers, e.g., ResNet layers. Training engine 122 can convert the identity embedding 236A, the attribute embedding 236B, and the iteration identifier embedding into the combined embedding 242 using the embedding adder 238, for example.

In step 408, training engine 122 converts, using a neural network and based on the combined embedding, a first input image that includes first noise into predicted noise. The predicted noise can correspond to a first predicted image depicting one or more facial features that include one or more facial identity features. For example, the predicted noise can be converted to the first predicted image. The neural network can be, for example, diffusion model 254.

In step 410, training engine 122 updates parameters of the diffusion neural network based on a noise reconstruction loss 260 associated with a predicted noise 256 and a pure noise image 244. In other embodiments, e.g., if identity loss is used as described herein with reference to FIG. 2A, a reconstruction loss can be associated with the first predicted image and a second input image having less noise than the first input image, where the first input image was generated by adding noise to the second input image.

In step 412, training engine 122 determines whether or not training using the reconstruction loss is to continue. For example, training engine 122 could determine that the diffusion neural network should continue to be trained using the reconstruction loss until one or more conditions are met. These condition(s) include (but are not limited to) convergence in the parameters of the diffusion neural network, the lowering of the reconstruction loss to below a threshold, and/or a certain number of training steps, iterations, batches, and/or epochs. While training for reconstruction continues, training engine 122 repeats steps 402-412.

Figure 5:
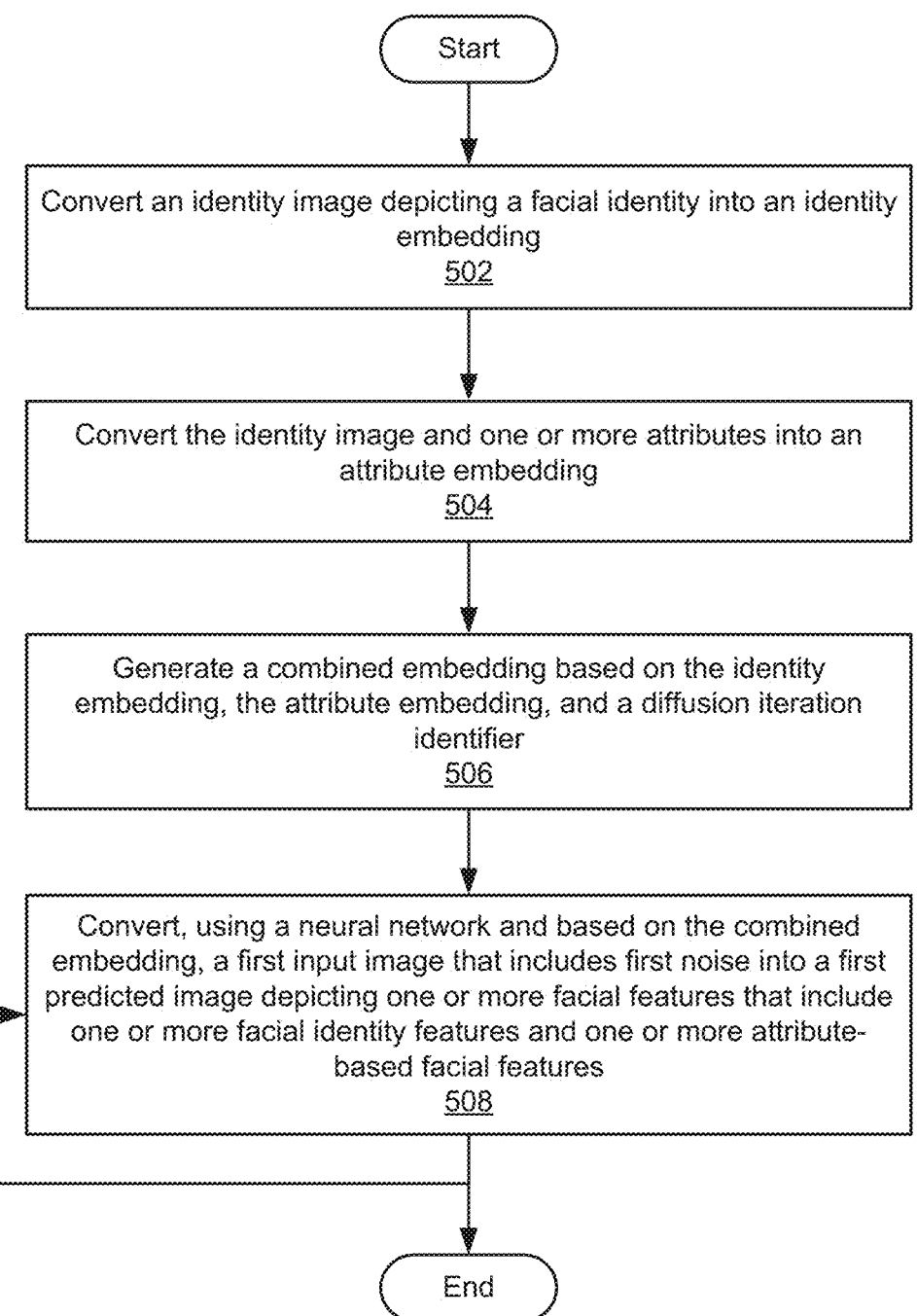
FIG. 5 is a flow diagram of method steps for generating a de-noised image from an identity embedding, an attribute embedding, and iteration identifiers, according to various embodiments.

FIG. 5 is a flow diagram of method steps for generating a de-noised image from an identity embedding, an attribute embedding, and iteration identifiers, according to various embodiments. Although the method steps are described in conjunction with the systems of FIGS. 1-2C, persons skilled in the art will understand that any system configured to perform the method steps in any order falls within the scope of the present disclosure.

As shown, in step 502, execution engine 124 converts an identity image depicting a facial identity into an identity embedding. In step 504, execution engine 124 converts the identity image and/or one or more attributes into an attribute embedding. In step 506, execution engine 124 generates a combined embedding based on the identity embedding, the attribute embedding, and a diffusion iteration identifier 240.

In step 508, execution engine 124 converts, using a neural network and based on the combined embedding, a first input image that includes first noise into a first predicted image depicting one or more facial features that include one or more facial identity features and one or more attribute-based facial features. Execution engine 124 performs a sequence of inference de-noising iterations 380. In the first iteration, execution engine 124 generates predicted noise 256 based on a pure noise image 244. In the second and subsequent iterations, execution engine 124 generates predicted noise 256 based on a current de-noised image 308 generated in the previous iteration. In each de-noising iteration 380, execution engine 124 converts the predicted noise 256 to a current de-noised image 308 using a noise-to-image converter 306. Execution engine repeats step 508 for each iteration, performing subsequent iterations 380 until a termination condition is satisfied after one of the iterations 380. The termination condition can be satisfied when a threshold number of iterations 380 have been performed, for example.

Figure 6:
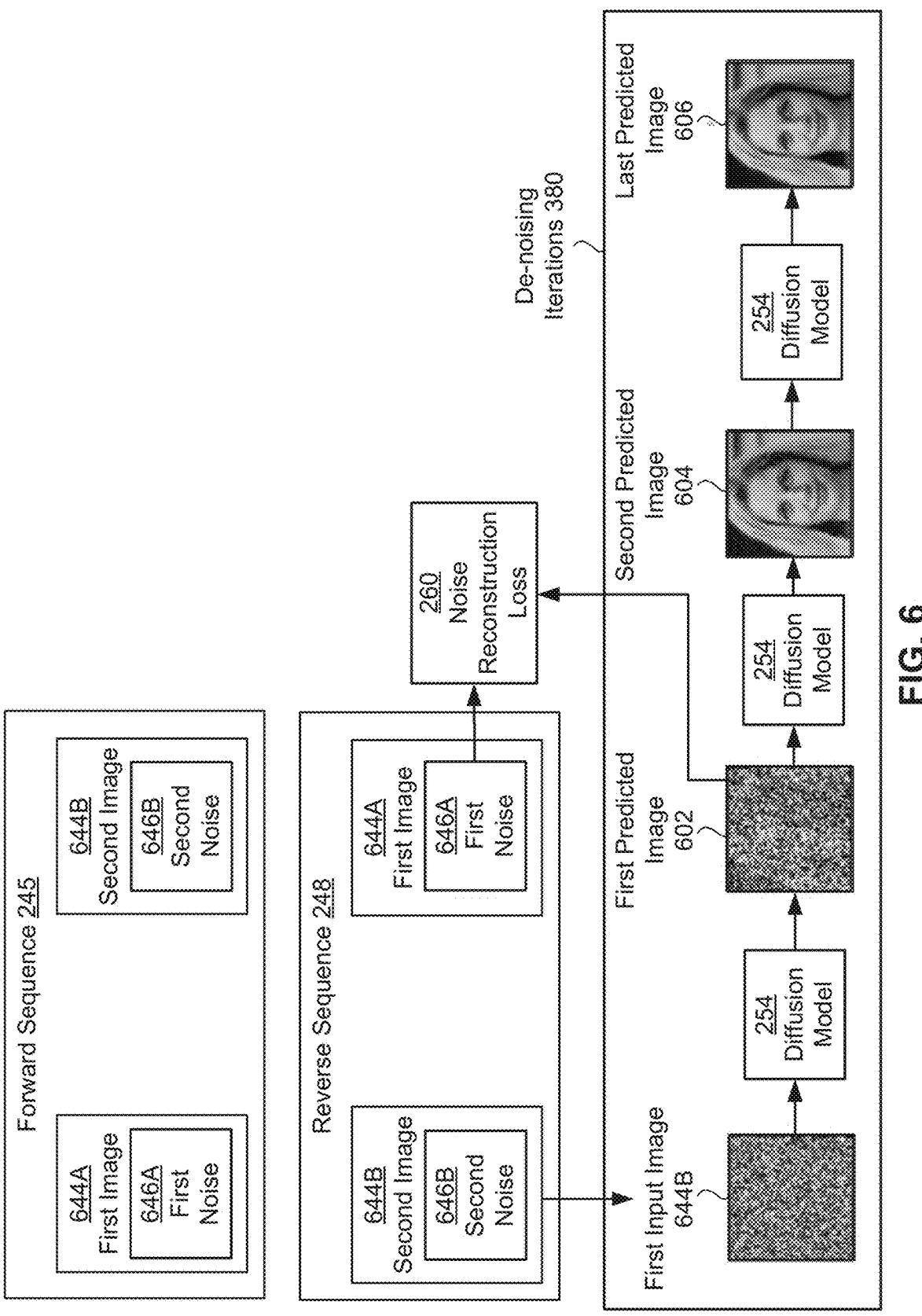
FIG. 6 illustrates iterative de-noising of images using a diffusion model, according to various embodiments.

FIG. 6 illustrates iterative de-noising of images using a diffusion model 254, according to various embodiments. In training engine 122, a forward sequence 245 includes a first input image 644A followed by a second input image 644B. The names of the images in the forward sequence begin with "second input image" for clarity of explanation. First input image 644A includes an amount of noise shown as first noise 646A, which can be no noise or an amount of noise less than an amount of noise in a second input image 644B that follows the first input image 644A sequentially in the forward sequence. The amount of noise in the second input image 644B is shown as second noise 646B. Second input image 644B includes an amount of noise shown as second noise 646B that is greater than first noise 644A. The forward sequence can include additional images that are not shown.

Training engine 122 generates the forward sequence from a clean image 202 by progressively adding an appropriate amount of noise to each successive image until the pure noise image 244 is produced. The pure noise image is the last image in the forward sequence. Training engine 122 generates a reverse sequence 248 by reversing the forward sequence. The reverse sequence includes the second input image 644B followed by the first input image 644A. The reverse sequence can include additional images not shown.

Training engine 122 performs training de-noising iterations 280 to predict an amount of noise on which the diffusion model 254 is trained. Execution engine 124 performs inference de-noising iterations 380 to generate predicted noise, converts each predicted noise to an image, and uses the image produced in the last iteration as an output image 312. De-noised output image 312 is shown in FIG. 6 as a last predicted image 606.

In execution engine 124, de-noising iterations 380 generate a sequence of de-noised images 602, 604, 606 having progressively less noise. The de-noised images include a first predicted image 602, a second predicted image 604, and a last predicted image 606. The first predicted image 602 and the second predicted image 604 each include both noise and content (a portion of an image of a face). The last predicted image 606 includes meaningful content (an image of a face) without noise.

The training engine 122 trains a diffusion model 254 by performing a training de-noising iteration 280. The iteration 280 calculates an amount of loss and updates the diffusion model 254 based on the amount of loss. In the iteration 280, the diffusion model 254 generates a predicted noise 256 based on a noisy image 252. The diffusion model can generate the predicted noise 256 further based on a randomly-selected diffusion iteration identifier 240 and a combined embedding 242 that is based on an identity embedding 236A and/or an attribute embedding 236B.

The training engine 122 generates the noisy image 252 based on a scaled image 270 and a scaled noise 250. The scaled image 270 is based on a clean image 202 and a weight of the clean image. The scaled noise 250 is based on a pure noise image 244 and a weight of the pure noise image 244. The weight of the clean image is determined according to a noise schedule, and the sum of the weight of the clean image and the weight of the pure-noise image is 1.

The training engine 122 determines a noise reconstruction loss 260 associated with the predicted noise 256 and the pure noise image 244, and updates the diffusion model 254 based on the noise reconstruction loss 260. The noise reconstruction loss 260 can be determined based on a difference between the predicted noise 256 and the pure noise image 244.

The execution engine 124 performs de-noising iterations 380 to generate a sequence of current de-noised images 308, the last of which can be used as a de-noised output image 312. In a particular de-noising iteration 380, execution engine 124 generates predicted noise 256 by providing a current de-noised image 308 from a previous iteration (or, in the first iteration, by providing a pure noise image 244) as input to the diffusion model 254. The execution engine 124 can also provide an inference iteration identifier 340 and a combined embedding 242 that is based on an identity embedding 236A and/or an attribute embedding 236B as input to the diffusion model 254.

In each iteration 380, execution engine 124 converts the predicted noise 256 to a current de-noised image 308 using a noise-to-image converter 306. In each subsequent iteration 380, execution engine 124 executes diffusion model 254 using the current de-noised image 308 output by the noise-to-image converter 306 in the previous iteration as input.

Figure 7:
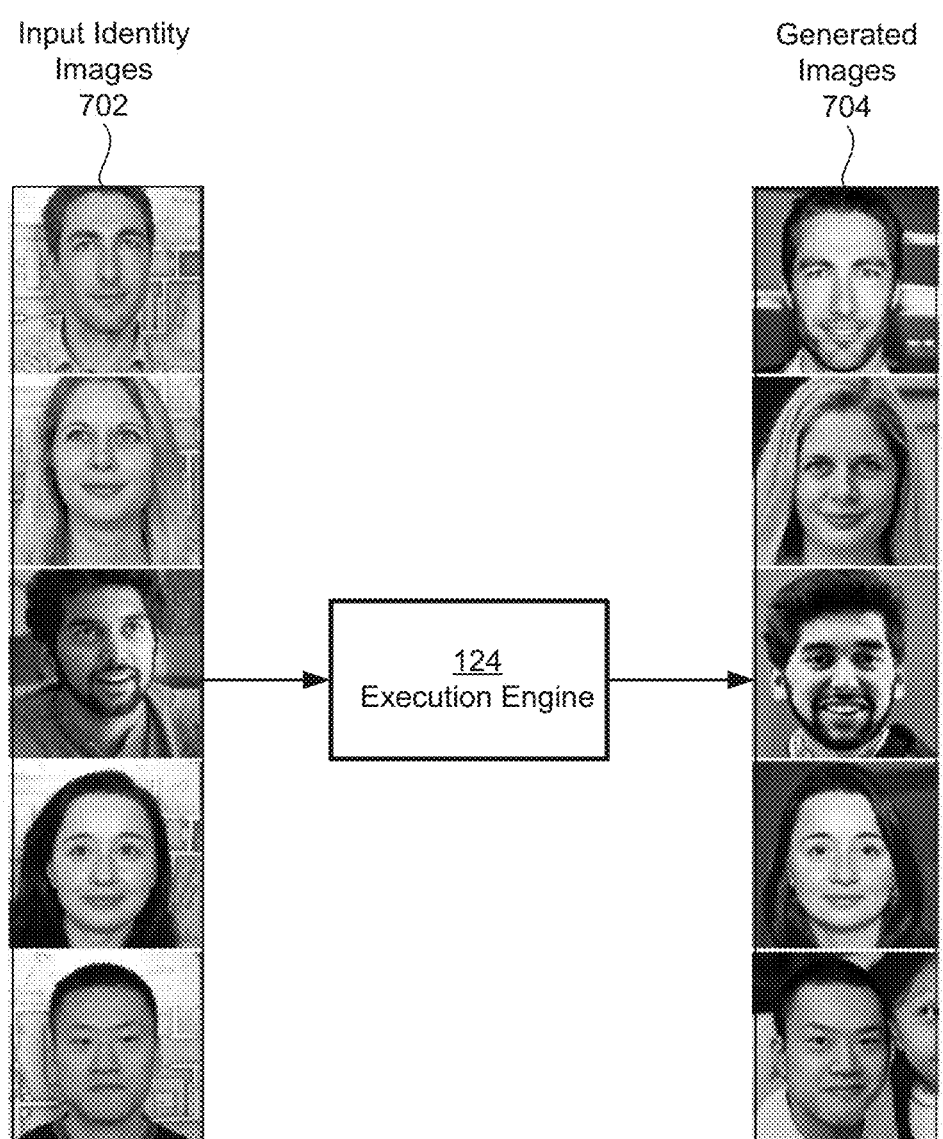
FIG. 7 illustrates generated images predicted from images of target identities by an execution engine using a diffusion model, according to various embodiments.

FIG. 7 illustrates generated images 704 predicted from images of target identities by an execution engine 124 using a diffusion model, according to various embodiments. The images of target identities are shown as input identity images 702 and include five images, each depicting a different face. For each of the input identity images 702, execution engine 124 generates a respective generated image 704 by converting the respective input identity image 702 to an identity embedding and performing the iterations shown in FIG. 3. For example, the execution engine 124 generates the topmost generated image 704 based on the topmost input identity image 702. As can be seen, the generated images 704 are similar to the respective input identity images 702.

In sum, the disclosed techniques train and execute a de-noising diffusion model that generates an image of a face based on a given identity embedding that represents an individual identity. The given identity embedding can be generated by a face recognition model based on a given face. When the identity embedding is provided as input to the de-noising diffusion model, an execution engine performs a sequence of de-noising iterations that start with an image of noise and successively remove a portion of noise from the image. In each iteration, an execution engine uses the diffusion model to replace a portion of noise in an input image with a portion of a face that is similar to the given face. In each iteration, the diffusion model predicts the noise to remove from the input image in the current iteration, and the execution engine converts the predicted noise to a current de-noised image. The prediction is based on the given identity embedding, a de-noised image predicted in the previous iteration (or, in the first iteration, a pure-noise image), and an iteration identifier such as an iteration number. The output image produced in the last iteration has no noise and depicts a face similar to the given face that was used by the face recognition model to generate the given identity embedding. The training engine trains a diffusion model by performing a de-noising iteration. The de-noising iteration calculates an amount of loss and updates the diffusion model based on the amount of loss. In a particular iteration, the diffusion model generates a first predicted noise based on a noisy image. The diffusion model can generate the predicted noise further based on a randomly-selected training iteration identifier and a combined embedding that is based on an identity embedding that represents an identity of a face and/or an attribute embedding that represents at least one attribute value of a face. The training engine generates the noisy image based on a scaled image and a scaled noise. The scaled image is determined as a product of a clean image and a weight of the clean image. The scaled noise is determined as a product of a pure-noise image and a weight of the pure noise. The weights can be determined according to a noise schedule. The training engine determines an amount of loss associated with the predicted noise and the pure-noise image, and updates the diffusion model based on the loss. The loss can be determined based on a difference between the predicted noise and the pure-noise image.

One technical advantage of the disclosed techniques relative to the prior art is that the identity embedding generated by a face recognition model can be converted to an image of the corresponding face without having access to internal information used by the face recognition model. In this regard, the disclosed techniques can be used to train a machine learning model in a way that uses diffusion techniques to generate a realistic, sharp image of the face that closely resembles the identity of the corresponding face from which the identity embedding was extracted. Another technical advantage of the disclosed techniques is the ability to control facial features in the generated image by performing addition operations that add appropriate values to the identity embedding. In this way, the depicted features can be changed to particular values. A particular value for a facial feature can be selected from a range of values. For example, identity can be varied across a range of identities to change identity features of the depicted images. In other examples, attributes such as age, hair color, pose, and emotion can be varied.

These technical advantages provide one or more technological improvements over prior art approaches.

1. In some embodiments, a computer-implemented method for performing identity-preserving image generation comprises: converting a first identity image depicting a first facial identity into a first identity embedding; generating a combined embedding based on the first identity embedding and a diffusion iteration identifier; and converting, using a neural network and based on the combined embedding, an input image that includes noise into a first predicted image depicting one or more facial features that include one or more first facial identity features, wherein the one or more first facial identity features correspond to one or more respective second facial identity features of the first identity image and are based at least on the first identity embedding.

2. The computer-implemented method of clause 1, further comprising causing the first predicted image to be outputted to a computing device.

3. The computer-implemented method of any of clause 1 or clause 2, wherein at least a portion of the noise is converted to at least a portion of the one or more facial features depicted in the first predicted image.

4. The computer-implemented method of any of clauses 1-3, wherein converting the input image into the first predicted image is repeated for a plurality of diffusion iterations.

5. The computer-implemented method of any of clauses 1-4, wherein the first predicted image generated in each diffusion iteration of the plurality of diffusion iterations includes less noise than a second predicted image generated in a previous diffusion iteration of the plurality of diffusion iterations.

6. The computer-implemented method of any of clauses 1-5, wherein the input image is generated based on a second predicted image that was generated by a previous diffusion iteration of the plurality of diffusion iterations.

7. The computer-implemented method of any of clauses 1-6, wherein the input image is a pure noise image in a first diffusion iteration of the plurality of diffusion iterations.

8. The computer-implemented method of any of clauses 1-7, wherein converting the input image into the first predicted image comprises: converting, using the neural network and based on the combined embedding, the input image to predicted noise; and converting the predicted noise to the first predicted image.

9. The computer-implemented method of any of clauses 1-8, further comprising: training the neural network based on a loss associated with the predicted noise and a pure noise image.

10. The computer-implemented method of any of clauses 1-9, wherein the loss comprises a reconstruction loss determined based on a difference between the predicted noise and the pure noise image.

11. The computer-implemented method of any of clauses 1-10, wherein the one or more identity features include one or more of hair color or gender.

12. The computer-implemented method of clauses 1-11, further comprising: converting one or more attribute values into an attribute embedding, wherein the combined embedding is further based on the attribute embedding, and wherein the one or more facial features further include one or more attribute-based facial features, and wherein each attribute-based facial feature is based on one or more of the attribute values.

13. The computer-implemented method of any of clauses 1-12, wherein the one or more attribute-based facial features include one or more of emotion, head pose, glasses, makeup, age, or facial hair.

14. The computer-implemented method of any of clauses 1-13, further comprising: generating an interpolated identity embedding by interpolating between the first identity embedding and a second identity embedding; and converting, using the neural network and based on the interpolated identity embedding, the input image that includes the noise into a second predicted image depicting one or more second facial features that include one or more second facial identity features, wherein the one or more second facial identity features are based on a combination of the first identity image from which the first identity embedding was generated and a second identity image from which the second identity embedding was generated.

15. The computer-implemented method of clauses 1-14, further comprising: identifying, using metadata for a data set on which the diffusion model is trained, a direction in the first identity embedding, wherein the direction corresponds to a facial identity feature; updating the first identity embedding by adding a determined value to the first identity embedding; and converting, using a neural network and based on the first identity embedding, the input image that includes the noise into a second predicted image depicting a modified facial identity feature that has changed by an amount that corresponds to the determined value.

16. The computer-implemented method of clauses 1-15, further comprising: identifying a second identity embedding that represents a second facial identity in the latent space; generating an interpolated identity embedding based on a weighted average of the first identity embedding and the second identity embedding, wherein the first identity embedding is weighted based on a first weight, and the second identity embedding is weighted based on a second weight; and converting, using a neural network and based on the interpolated identity embedding, the input image that includes the noise into a second predicted image depicting one or more interpolated facial features, wherein the one or more first facial identity features of the first facial identity have the first weight in the interpolated facial features, and one or more second facial identity features of the second facial identity have the second weight in the interpolated facial features.

17. In some embodiments, a system comprises: one or more memories that store instructions, and one or more processors that are coupled to the one or more memories and, when executing the instructions, are configured to perform the steps of: converting a clean image depicting a facial identity into an identity embedding; converting, using a neural network and based on the identity embedding and a diffusion iteration identifier, a first input image that includes first noise into predicted noise; and training the neural network based on a loss associated with the predicted noise and an image of pure noise.

18. The system of clause 17, wherein the loss comprises a reconstruction loss determined based on a difference between the predicted noise and the image of pure noise.

19. In some embodiments, one or more non-transitory computer-readable media store instructions that, when executed by one or more processors, cause the one or more processors to perform the steps of: converting an identity image depicting a facial identity into an identity embedding; generating a combined embedding based on the identity embedding and a diffusion iteration identifier; and converting, using a neural network and based on the combined embedding, a first input image that includes first noise into a first predicted image depicting one or more facial features that include one or more first facial identity features, wherein the one or more first facial identity features correspond to one or more respective second facial identity features of the identity image and are based at least on the identity embedding.

20. The one or more non-transitory computer-readable media of clause 19, further comprising causing the first predicted image to be outputted to a computing device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing identity-preserving image generation, the computer-implemented method comprising:
   converting a first identity image depicting a first facial identity into a first identity embedding;
   generating a combined embedding based on the first identity embedding and a diffusion iteration identifier; and
   converting, using a neural network and based on the combined embedding, an input image that includes noise into a first predicted image depicting one or more facial features that include one or more first facial identity features,
   wherein the one or more first facial identity features correspond to one or more respective second facial identity features of the first identity image and are based at least on the first identity embedding.

2. The computer-implemented method of claim 1, further comprising causing the first predicted image to be outputted to a computing device.

3. The computer-implemented method of claim 1, wherein at least a portion of the noise is converted to at least a portion of the one or more facial features depicted in the first predicted image.

4. The computer-implemented method of claim 1, wherein converting the input image into the first predicted image is repeated for a plurality of diffusion iterations.

5. The computer-implemented method of claim 4, wherein the first predicted image generated in each diffusion iteration of the plurality of diffusion iterations includes less noise than a second predicted image generated in a previous diffusion iteration of the plurality of diffusion iterations.

6. The computer-implemented method of claim 4, wherein the input image is generated based on a second predicted image that was generated by a previous diffusion iteration of the plurality of diffusion iterations.

7. The computer-implemented method of claim 4, wherein the input image is a pure noise image in a first diffusion iteration of the plurality of diffusion iterations.

8. The computer-implemented method of claim 1, wherein converting the input image into the first predicted image comprises:
   converting, using the neural network and based on the combined embedding, the input image to predicted noise; and
   converting the predicted noise to the first predicted image.

9. The computer-implemented method of claim 8, further comprising:

training the neural network based on a loss associated with the predicted noise and a pure noise image.

10. The computer-implemented method of claim 9, wherein the loss comprises a reconstruction loss determined based on a difference between the predicted noise and the pure noise image.

11. The computer-implemented method of claim 1, wherein the one or more identity features include one or more of hair color or gender.

12. The computer-implemented method of claim 1, further comprising:

converting one or more attribute values into an attribute embedding, wherein the combined embedding is further based on the attribute embedding, and wherein the one or more facial features further include one or more attribute-based facial features, and wherein each attribute-based facial feature is based on one or more of the attribute values.

13. The computer-implemented method of claim 12, wherein the one or more attribute-based facial features include one or more of emotion, head pose, glasses, makeup, age, or facial hair.

14. The computer-implemented method of claim 1, further comprising:

generating an interpolated identity embedding by interpolating between the first identity embedding and a second identity embedding; and converting, using the neural network and based on the interpolated identity embedding, the input image that includes the noise into a second predicted image depicting one or more second facial features that include one or more second facial identity features, wherein the one or more second facial identity features are based on a combination of the first identity image from which the first identity embedding was generated and a second identity image from which the second identity embedding was generated.

15. The computer-implemented method of claim 1, further comprising:

identifying, using metadata for a data set on which the diffusion model is trained, a direction in the first identity embedding, wherein the direction corresponds to a facial identity feature;

updating the first identity embedding by adding a determined value to the first identity embedding; and converting, using a neural network and based on the first identity embedding, the input image that includes the noise into a second predicted image depicting a modified facial identity feature that has changed by an amount that corresponds to the determined value.

16. The computer-implemented method of claim 1, further comprising:

identifying a second identity embedding that represents a second facial identity in the latent space;

generating an interpolated identity embedding based on a weighted average of the first identity embedding and the second identity embedding, wherein the first identity embedding is weighted based on a first weight, and the second identity embedding is weighted based on a second weight; and converting, using a neural network and based on the interpolated identity embedding, the input image that includes the noise into a second predicted image depicting one or more interpolated facial features, wherein the one or more first facial identity features of the first facial identity have the first weight in the interpolated facial features, and one or more second facial identity features of the second facial identity have the second weight in the interpolated facial features.

17. One or more non-transitory computer-readable media storing instructions that, when executed by one or more processors, cause the one or more processors to perform the steps of:

converting an identity image depicting a facial identity into an identity embedding;

generating a combined embedding based on the identity embedding and a diffusion iteration identifier; and converting, using a neural network and based on the combined embedding, a first input image that includes first noise into a first predicted image depicting one or more facial features that include one or more first facial identity features, wherein the one or more first facial identity features correspond to one or more respective second facial identity features of the identity image and are based at least on the identity embedding.

18. The one or more non-transitory computer-readable media of claim 17, further comprising causing the first predicted image to be outputted to a computing device.

* * * * *